(12) United States Patent
Conner

(10) Patent No.: US 11,259,153 B1
(45) Date of Patent: Feb. 22, 2022

(54) SESSION ORIENTED ENHANCEMENTS FOR TEXT-BASED COMMUNICATIONS IN A CONTACT CENTER

(71) Applicant: Noble Systems Corporation, Atlanta, GA (US)

(72) Inventor: Jason S. Conner, Stockbridge, GA (US)

(73) Assignee: Noble Systems Corporation, Atlanta, GA (US)

( * ) Notice: Subject to any disclaimer, the term of this patent is extended or adjusted under 35 U.S.C. 154(b) by 63 days.

(21) Appl. No.: 16/900,138

(22) Filed: Jun. 12, 2020

(51) Int. Cl.
| | |
|---|---|
| *H04W 40/00* | (2009.01) |
| *H04W 4/14* | (2009.01) |
| *H04L 51/58* | (2022.01) |
| *H04L 67/14* | (2022.01) |
| *H04M 3/42* | (2006.01) |
| *H04M 3/51* | (2006.01) |

(52) U.S. Cl.
CPC .............. *H04W 4/14* (2013.01); *H04L 51/38* (2013.01); *H04L 67/14* (2013.01); *H04M 3/42382* (2013.01); *H04M 3/5191* (2013.01)

(58) Field of Classification Search
CPC .......... H04W 4/14; H04W 4/12; H04L 51/38; H04L 67/14; H04L 65/1066; H04M 3/42392; H04M 3/5951; H04M 3/5183
USPC ...................................... 455/466, 418, 422.1
See application file for complete search history.

(56) References Cited

U.S. PATENT DOCUMENTS

| | | | | |
|---|---|---|---|---|
| 10,021,245 | B1* | 7/2018 | Koster ................ | H04M 3/5133 |
| 10,284,723 | B1* | 5/2019 | Neuer, III ........... | H04M 3/5175 |
| 10,447,853 | B1* | 10/2019 | Ouimette ............ | H04M 3/5133 |
| 10,616,345 | B1* | 4/2020 | Ouimette ................ | H04L 67/26 |
| 2014/0368601 | A1* | 12/2014 | deCharms ............... | H04L 67/26 |
| | | | | 348/14.02 |
| 2015/0289179 | A1* | 10/2015 | Liu ........................ | H04W 36/14 |
| | | | | 370/331 |
| 2017/0318012 | A1* | 11/2017 | Kim ...................... | H04L 67/306 |
| 2017/0318152 | A1* | 11/2017 | Chen ................. | H04M 3/42068 |
| 2018/0234795 | A1* | 8/2018 | Reitz ........................ | H04L 51/32 |
| 2021/0007041 | A1* | 1/2021 | Wallentin .............. | H04W 48/16 |

* cited by examiner

Primary Examiner — Danh C Le
(74) Attorney, Agent, or Firm — Blank Rome, LLP

(57) ABSTRACT

Various processes are defined associated with customer-initiated text messages to a contact center to delineate various sessions between the customer and an agent. The sessions are defined in part using various timers, including a customer response timer that is stopped upon receipt of a customer text and started typically started when the agent response is sent. The session is initiated upon the initial customer text and the expiry of the customer response timer defines the end of a particular session with the customer. Various data structures are created or updated upon the beginning of a session, including tables which may define which sessions a customer previously had and the messages associated with each session. The agent may be able to review prior sessions for a given customer and can review the specific messages of a prior session.

20 Claims, 11 Drawing Sheets

SESSION ORIENTED ENHANCEMENTS FOR TEXT-BASED COMMUNICATIONS IN A CONTACT CENTER

BACKGROUND

The Short Message Service ("SMS") form of text messages ("text") is a popular form of communication that has been incorporated into contact centers. Consumers can now interact with agents in contact centers using SMS, which provides additional convenience for consumers, in that queries/responses can occur over a time period suiting the convenience of the consumer. Further, because SMS is typically used with a mobile phone, it offers convenience as to where the consumer can interact with the contact center; the consumer is no longer required to be situated at a laptop or desktop computer. While voice calls allow expediate exchange of information once contact is established, a voice call requires the immediate interaction of the parties in real time. On the other hand, texting allows simple queries, responses, or notifications to be provided that can be sent or viewed at the convenience of the consumer. Responses are not expected to be received in real time. The duration of an interaction using SMS may be as short as less than a minute for a simple query/response and typically does not last more than an hour. Frequently, there are one or more interactions between the consumer and the agent, and the parties frequently implicitly understand that the dialogue in a text conversation is expected to occur faster than an email exchange, but not as quick as a chat exchange. In other words, responses may be delayed for several minutes or longer. This is one of the advantages of using a SMS texting channel.

Text messaging (along with email) is a form of connectionless communications. Each message is a stand-alone communication instance that is not necessarily part of a connection, longer dialogue, or session between the two parties. For example, a during a voice connection, it is clear to the parties that a dialog comprising real-time verbal interactions is occurring. There is a formal beginning and termination of the connection recognized by the parties and the equipment used. Each separate phone call can be considered as a separate session between the parties. Any communication occurring after the connection terminated is logically distinct and associated with another session. In a text messaging context, a session comprises at least two messages, each send from one party to another. Thus, a text asking a question and its response text providing the answer could be considered a session. Frequently, there may be more than two texts in a session.

However, with text messages, Consumer A may send sequential text messages to Business B inquiring about, e.g., whether they have widgets in stock and whether the business is open. It is not readily clear whether this is to be viewed as two questions within a single session or two distinct sessions. Further, a single response from Business B (e.g., "Yes") is not necessarily clear as to which question it answers (whether widgets are stock or whether the business is open). Further confusion can arise when the dialog is spread out over time and if there are multiple separate sessions interspersed in parallel.

There are several techniques which can reduce confusion and delineate the sessions. While one approach can interpret the semantics of the contents of the text, this is complicated to implement algorithmically. Another technique more amendable to algorithmic implementation includes considering the relative timing of the messages between the parties and context of the contents. The timing can be ascertained by considering, e.g., timestamps associated with the sending/receipt of the messages. Long time periods between texts originated from a consumer may be interpreted as implicitly ending one session and beginning a new, separate session. As expected, because there is no definitive time period that distinguishes between when a session ends and a new one begins, it can be difficult to distinguish between a message that is a late response to an existing dialogue versus a message that is intended to begin a new dialogue. Further, even based on the context of the message contents, it may not be clear whether a message is intended to, e.g., answer the question and terminate the dialogue, or just answer the question and wait for a further question.

When a contact center fields customer inquiries via text, there are aspects unique to contact centers that add further complexity. The text messages received from a consumer may be directed to and handled by different agents at different times. This is different from the typical mobile user texting application where the same person is usually associated with a given SMS address. Obviously, it is desirable for texts associated with a single session sent to an enterprise or contact center to involve the same agent. However, as noted above, it may not always be clear whether a text from a consumer is intended to continue a prior session or start a new session. Hence, it may be difficult to determine by the communications handler in the contact center whether a given text should be routed to the same agent that last handled an inquiry from the customer, or whether the current text may be routed to a different agent based on starting a new session. Frequently, the original agent may not be working at the time a subsequent message is received or the agent may be engaged in other activities (i.e., such as taking a break). Thus, a new agent may be assigned to handle the communication if it is to be handled in a timely manner. This issue does not occur to same level when texts are sent between two parties on mobile phones, since the same person is expected to be involved in the session. This illustrates one of the distinctions between texting between a customer and a contact center versus texting between two mobile users.

Thus, it is important for contact center to be able to identify messages which are part of an existing session versus that of a new session in part in order to determine which agent should respond to a text. Specifically, the contact center must determine whether a message from a customer is intended to end a session or begin a new session. Grouping text messages into a session is important because messages associated with a session may be retrieved, reviewed, or otherwise processed in various ways, so being able to group messages into a session is critical and being able to identify which messages are part of the session is necessary. For example, how messages are associated with a session may impact how a recent incoming message is to be routed. On the other hand, if a recent message is the beginning of a new session, then routing it to the same agent handling the prior session may not as critical. If a new agent is receiving the message, then being able to review the messages in the prior session involving the customer becomes important for the agent to properly respond to the message.

Furthermore, contact centers frequently measure, track, project, and schedule resources based on the number of sessions handled by an agent or during a time period. Tracking the number of prior sessions is one way of predicting a future number of sessions. This in turn, impacts how many agents may be required, which turn impacts how scheduling should occur. Thus, knowing whether a message forms a new session or whether the message is a continuation of a prior session impacts the number of sessions being processed and involves how agents and other resources are allocated, scheduled, and measured. For all of these and other reasons, improved mechanisms for identifying and associating text messages with a session in a contact center are needed.

BRIEF SUMMARY

Technologies are generally presented herein that apply various controls and/or processing aspects to text-oriented contact center communications to facilitate session-oriented treatment of text communications. In one embodiment, the controls involve the definition and application of various response timers. One timer, a customer response timer can be used to determine when a session has ended. In addition, various configurations can govern the state of an agent for when a session has ended. Delineating sessions also facilitates management as to how many sessions an agent may be involved in. In another embodiment, controls can be associated with various responses selected by the agent to impact when certain timers are started and impact when a session is determined to have ended. Other controls may be associated with when a response should be sent by an agent to ensure the agent is responsive and does not abuse various performance metrics. These are other aspects to facilitate managing text-based communications in accordance with session-oriented aspects that are disclosed herein.

The subject matter disclosed herein may be implemented as a computer-controlled apparatus, a computer process, a computing system, or as an article of manufacture such as a non-transitory computer readable storage medium. These and various other features will be apparent from the following Detailed Description and the associated drawings.

This Summary is provided to exemplify concepts at a high level that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
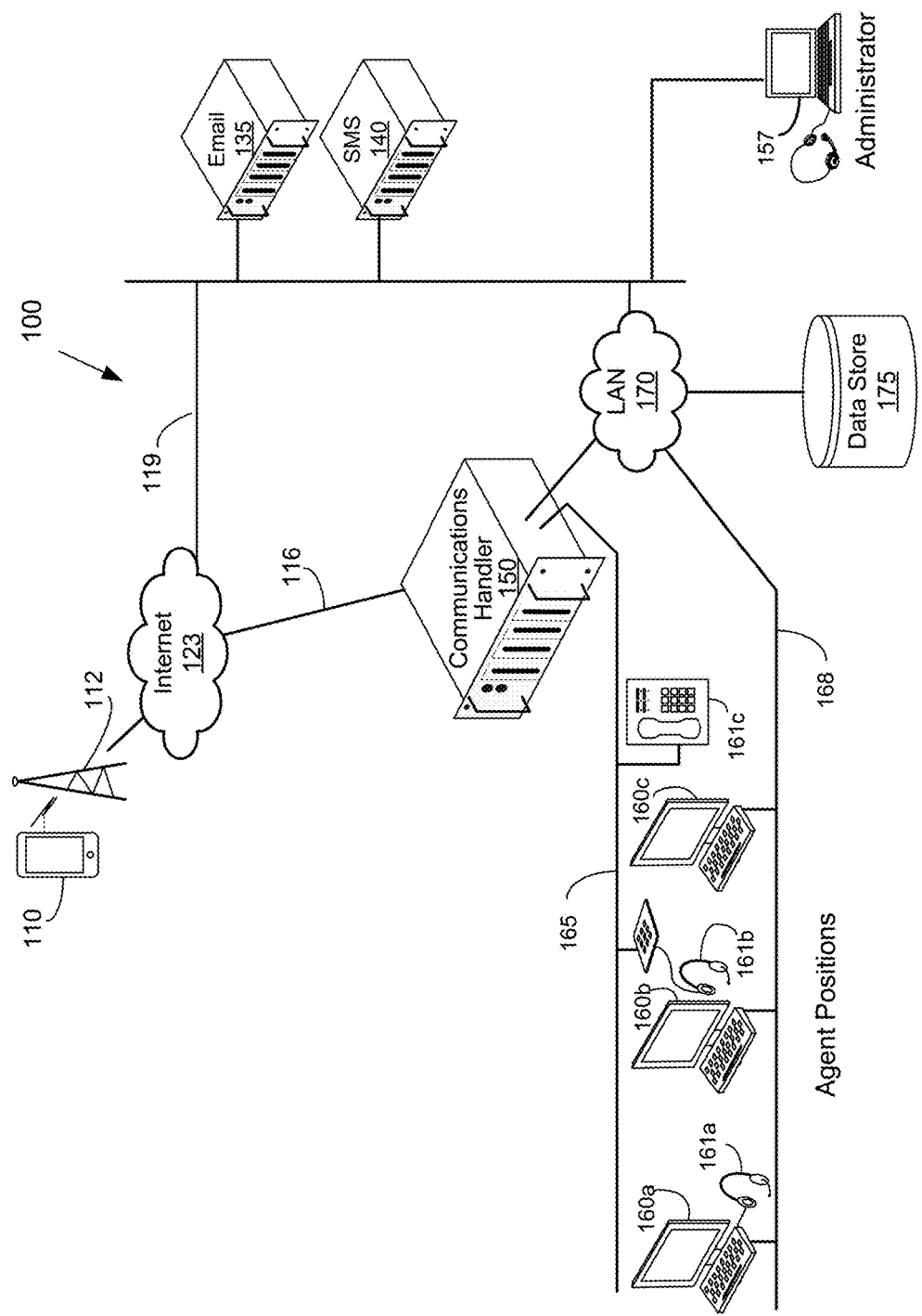
FIG. 1 shows one embodiment of a contact center in which the concepts and technologies herein may be applied to provide for improved session oriented treatment of SMS text messages processed by a communications handler in a contact center.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments that apply the teachings and concepts disclosed herein. Like numbers in the drawings refer to like elements throughout. Embodiments of the invention may be utilized in various industries, as will become apparent to those of ordinary skill in the art as they read the disclosure. However, for purposes of this disclosure, applications involving contact centers are mainly used for illustrating various embodiments of the invention.

Exemplary Contact Center Architecture

FIG. 1 illustrates one embodiment of an architecture 100 involving a contact center that may be used in accordance with the various technologies and concepts disclosed herein. The contact center shown in FIG. 1 may process voice calls and non-voice communications that are inbound-only, outbound-only, or a combination of both (sometimes referred to as a "blended" contact center). Although many aspects of contact center operation may be disclosed in the context of text calls, the contact center may process other forms of communication such as, for example, voice telephone calls, facsimiles, emails, video calls, and chat messages.

Since the contact center may handle communications originating from a party, or initiated to a party, the term "remote party," "user", "consumer," or "customer" without any further qualification, refers to a remote person associated with a communication processed by the contact center, where the communication is either received from or placed to the party. Specifically, reference to customer originated text should not be interpreted as being so limiting that the remote party must be an actual customer of the enterprise that is receiving the text. Since it may be frequently the case that an enterprise refers to the remote parties interacting with it as "customers" even if they are only potential customers, this term is used herein to refer to the remote party interacting with the agents, regardless of whether the party is an actual or potential customer.

Depending on the embodiment, inbound text calls typically originate from calling parties using a mobile phone device 110, such as a smart phone, tablet, or other mobile device, which wirelessly communicates with a mobile service provider ("MSP") 112. The MSP may convey the text communication on its own internal or external internet 123, which may interface with the communications handler 150. Alternatively, the SMS text messages may pass over a facility 119 from a service provider to a SMS gateway 140, which may be part of the contact center or separate from the contact center. In various embodiments, there may be other intermediate providers involved in routing the call to the contact center. There the SMS gateway 140 may forward the text to the communications handler 150 using a LAN 170 or other arrangement. The exact path or components used to route the text message to the communications handler in the contact center is not particularly relevant, as the processes described herein pertains to how the communications handler processes the text after it is received.

In particular embodiments, the communications handler 150 may be a specialized switch capable of receiving and routing other inbound communication types, such as voice calls, under various conditions. Further, the communications handler 150 may be embodied as a dedicated form of equipment readily available from various manufacturers, or the communications handler 150 may be a so-called "soft switch" comprising a suitable programming module executed by a processing device to perform the necessary specialized functions. The communications handler 150 may route an incoming communication over contact center facilities 165 to phone device or computer used by an available agent. Depending on the embodiment, the facilities 165 may be any suitable technology for conveying the text call, including but not limited to a local area network ("LAN") 170, wide area network ("WAN"), ISDN, or conventional TDM circuits. In addition, the facilities 165 may be the same or different from the facilities used to transport the call to the communications handler 150.

In various embodiments, communication may be routed over facilities 165 to an agent for servicing. That is, for example, the party may speak or interact with an agent to receive customer service. The physical area at which the agent sits is often referred to as an agent "position" and these positions are often grouped into clusters managed by a supervisor, who may monitor calls and the agents' productivity. An agent typically uses a specially configured computing device 160a-160c, such as a computer with a display, and a voice device 161a-161c that is adapted for various contact center functions associated with processing communications. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the communication to the agent's workstation" means routing the communication to one of the voice devices 161a-161c at the agent's position. Similarly, "routing the communication to the agent" means routing a call to the appropriate equipment at an agent's position. The workstation typically has a display, typically provided via a computer monitor. This is used to convey information to the agent about the communication, and the agent may interact with the communications handler using a mouse or other pointing device in conjunction with their computer display.

Agents typically log onto their workstations and/or communication handler prior to handling communications. The workstation may communicate this login information to the communications handler. This allows the contact center (including the communications handler) to know which agents are available for handling communications. In particular embodiments, the communications handler 150 may also maintain data of an agent's skill level that may be used to route a specific communication to the agent or group of agents having the same skill level. The communications handler may also know what type of channel and how many channels the agent can handle at any given time. In particular instances, if a suitable agent is not available to handle a communication, the communications handler 150 may queue the communication for the next available suitable agent. As can be expected, various algorithms may be employed to process calls in an efficient manner.

Depending on the embodiment, the interaction between the various components shown may involve using a local area network ("LAN") 170. However, other configurations are possible, such as, but not limited to, using a wide area network, wireless network, router, bridge, direct point-to-point links, etc. Thus, in lieu of facility 165 for conveying audio to the agents, other facilities 168 interfacing with the LAN 170 may be used for sending communications involving the agent stations.

The contact center may also receive other forms of non-voice communications, such as email messages. The email messages may be sent by a user using, e.g., a smart phone 110 conveying the messages by the Internet 123 to an email server 135 in the contact center. The email center may provide the emails to the communications handler 150, which then queues the email message to the appropriate agent.

Those skilled in the art will recognize that other architecture alternatives exist for accomplishing the exchange of chat, text, and email messages. For example, any of the email server 135 or SMS gateway 140 could be integrated into the communications handler 150. Other embodiments may require interaction with various servers in various service providers. Further, other types of non-voice messages could be exchanged, and may involve additional elements, such as fax servers, social media web sites, etc.

As will be discussed in greater detail, an incoming communication may be received directly at the communications handler 150, or at one of the servers/gateways 135 or 140. The server/gateway will then inform the communications handler 150 of the particular communication session. The communications handler 150 will then determine which agent is authorized, suitable, and available to handle the communication, based in part on various configuration parameters. For example, incoming text sessions could be allocated to agents on a round-robin basis, but incoming emails could be allocated to agents based on a least-number-of-emails-served basis, while chat sessions could be allocated to the first available agent, based on seniority. Other methods could be allocated that are known in the art for selecting an agent from a pool of agents.

The administrator computer 157 may be used by the administrator to configure the agent authorization and selection procedures, which may involve configuring the various servers/gateways and the communications handler 150. The administrator may have access to various data structures (as discussed herein) for defining what types of communication channels an agent may handle and how many. Thus, the administrator has the ability to adjust the 'mix' of channel types that agents may handle. This can be done for various reasons, including to account for day-to-day variations in the agent's work ability.

Although a number of the above components may be referred to as a "server," each may be also referred to in the art as a "computing device," "processing system", "unit", or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 150 or other components (such as SMS gateways) may be combined into a single hardware platform executing one or more software modules. In addition, the architecture 100 may be provided as a hosted solution, where the call processing functionality is provided as a communication service (a so-called "communication-as-a-service" or "CaaS") to a contact center operator. Thus, there is no requirement that the servers identified above actually be located or controlled by a contact center operator.

In addition, depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Those skilled in art will recognize FIG. 1 represents one possible configuration of a contact center architecture 100, and that variations are possible with respect to the protocols, facilities, components, technologies, and equipment used. For example, various algorithms and queuing arrangements may be defined to efficiently process and/or place calls.

High Level Service Concepts

Text messages are sometime described as a form of "connectionless" communication, because each message is stand-alone and can be sent at any time. Each message is procedurally viewed as independent and separate from any other text message. Thus, there is no requirement or process to formally establish a connection in order to send a text message. Other forms of communications, such voice telephone calls, are considered as "connection oriented" communications and have a distinct process for establishing a connection and only after the connection has completed can information be communicated. Connection oriented communications also have a distinct process for terminating the connection, after which no further information can be sent.

Information exchanged during a connection can be easily grouped with or linked to a connection. Contact centers frequently perform various operational and administrative aspects by managing voice connections. For various similar reasons, it is useful to group and categorize text messages as being associated with each other in some manner. Since connections do not exist for text messages, the concept of a 'session' is introduced. A text session is considered to be a set of messages between two parties that are logically associated with each other. In the contact center example, it is useful to identify all text messages originating from a given source that interacted with a given agent. Or, it can be useful to identify a cluster of messages from a customer interacting with a particular agent within a particular time period or dealing with a particular topic. This facilitates retrieval and review of information by humans and other processing systems. There could be various criteria to define exactly what messages form a session. As discussed below, the relative timing is used to distinguish sessions.

In a connection-oriented environment, it is clear that information transferred from Party A to Party B is within the context of that connection or session. However, in the context of connectionless communications, such as with text messages, Party A can sent two messages during a given day such as, "Are you open?" and "Do you have widgets in stock?" A response sent the following day (e.g., "yes") is not inherently associated a particular question. It is not facially obvious whether the sender intended to ask two questions during a single session or one question each in two distinct sessions. Of course, it is possible to define some ad-hoc rules for minimizing confusion. For example, it can be presumed that a response (e.g., "yes") applies to the first sent message ("Are you open?"). However, in many other instances, a diametrically opposite rule could be defined where the response applies to the most recently sent prior message ("Do you have widgets in stock?")

One way to delineate sessions when sending texts is based on the relative time between messages. Various timers can be defined governing when a customer and/or agent responds. These timers can be used to delineate whether a text is to be considered as part of a given session or a new session, or whether an existing session has ended. The application of timers is an estimate use to limit the bounds of a session, as no one single timer value will always properly reflect the particular context of when a session ends/begins. Thus, it is expected that the delineation of a text session may not always be correct. In light of this expected inaccuracy, additional tools can be made available for agents, allowing them to review prior sessions. Agents may need to review prior sessions in order to better understand the context of a current session. For example, the application of timers may define an incoming text as a new customer inquiry (i.e., session), when, in fact, the text is related to a prior inquiry (i.e., session). If the agent can easily review prior sessions from the caller, then any complications resulting from incorrectly interpreting the text can be minimized.

Further complicating connectionless communications is determining when a session has completed. In a connection-oriented environment, terminating the connection involves a particular protocol that signals to the equipment that the session between the parties is over. Usually, the parties are aware of the connection is about to be terminated (e.g., they may respond with "good-bye"). It is possible that the connection may be unexpectedly dropped in the middle of a session, but again this is clearly known by the parties when this occurs.

However, in a connectionless environment, a query may be sent by Party A and Party B may respond quickly. However, it may not be clear to Party B that the session is over or whether only the first of several questions was asked. Party A may have further questions. On the other hand, Party B may be waiting for further texts and no further texts are sent by Party A. Again, a timer can be useful in delineating when the session is over. It is recognized that regardless of how the timer value is set, it is possible that errors will occur, and a means for mitigating mistakes should be defined. For example, consider the scenario when a customer sends a first text message to a retailer and an agent responds quickly with an answer. It would be convenient if the same agent handles a follow up text/question from that same customer, but how long should the agent wait? How does the communications handler know whether to route the incoming text to which agent? It may not be always obvious from the context of the messages sent whether any follow up texts/questions (or answers thereto) will be sent.

Various equipment and processes in the contact center needs to delineate the series of text messages that forms a session. The contact center needs to measure how many sessions an agent processes during their shift or during a typically time period. The number of sessions that an agent handles during their shift may impact how the agent's performance is measured and how their compensation is determined. In other scenarios, the number of agents scheduled for a given time period may be determined by how many sessions each agent scheduled to work can handle. Scheduling agents to properly handle the expected volume of sessions may facilitate the allocation and utilization of the contact center's processing resources in a more efficient manner. In other applications, it may be necessary to review the contents of a particular session (e.g., to resolve a dispute). To better understand the context of an answer contained within of a particular text within that session, it may be necessary to review the texts in other sessions involving that same customer occurring just prior to the particular session.

In addition, the nature of the interaction of text is such that an agent may be able to handle more than one session. This requires that the communications handler control how many simultaneous sessions an agent can handle, which is another reason why contact center needs to have a mechanism to delineate sessions. While it is possible for the communications handler to easily distinguish each customer on an incoming text and assign each corresponding text as being associated with a different session, this still requires the communication handler to determine when a session ends with a particular customer. Otherwise, once a customer starts a session with an agent, the session could be considered as perpetually on-going.

For example, consider an agent receiving an incoming text from Customer A. The communications handler can consider the agent as now being involving in one session. Shortly thereafter, the same agent receives an incoming text from customer B and Customer C. So, the agent would now be involved with three sessions. At some point, the first session will be deemed to have been completed, such that the agent is now involved with only (3−1=2) two sessions. Otherwise, the number of sessions will cumulatively increase throughout the agent's shift. This illustrates the need to determine once a session has completed.

Agent Session States

Figure 2:
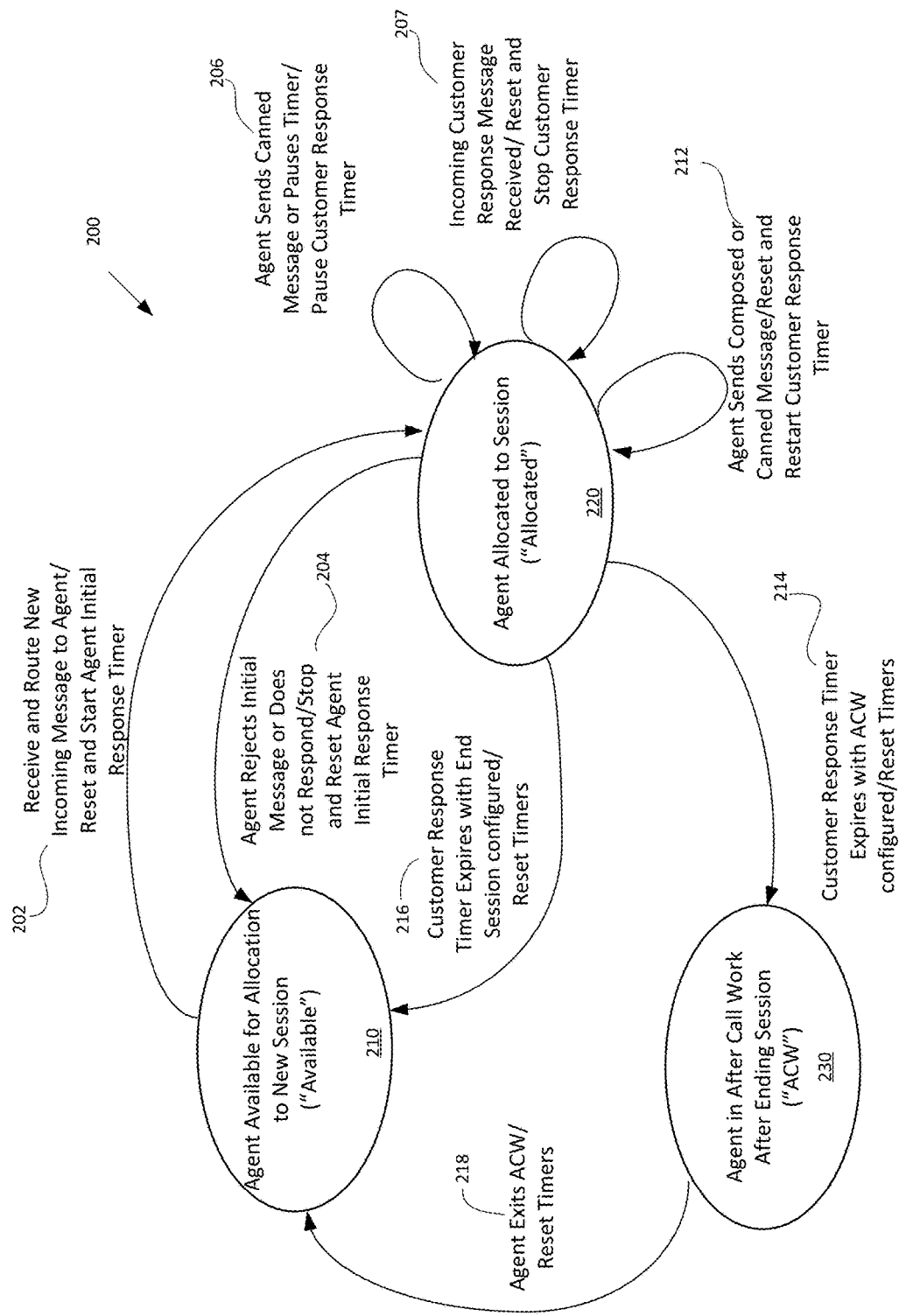
FIG. 2 shows one embodiment of various high level states in which an agent can be categorized with respect to handling a new text session.

FIG. 2 illustrates various work states that an agent can be in with respect to a session. The state can be used to define (along with other parameters) whether the agent can accept an incoming text for purposes of handling another session and how to start/stop various response timers. For purposes of illustration, and not limitation, the following example presumes that the agent can handle one (and only one) session. Typically, an agent can handle more than one session, for example, many agents can handle several sessions at a time. Thus, the diagram of FIG. 2 could be replicated several times, one for each session handled by the agent.

At a high level, the diagram 200 of FIG. 2 involves two main states, though three states are shown. The first state 210, reflects that the agent is available to be allocated a new text session. In other words, the agent is not currently allocated to a session or has just completed a session. This could be referred to as the "available" state. If a text message from a customer is received, the incoming text message may be routed to the agent 202. At this point, the agent is in the second state 220, wherein the agent is allocated to a text session. This could be referred to as the "allocated" state 220. Normally, once the session has ended, the agent would transition back to the available state 210. It is conceptually straightforward to consider the agent as in one of these two states 210, 220 based on whether they are in a session or available for a session. In this regard, the two main states can be viewed as a binary choice.

However, a third state is defined which reflects the unique requirements of a contact center. This third state can be viewed as an "in-between" state where the agent is not actively involved in a session, but is not yet available to be assigned to a new session. This is called the "after-call work" state 230 ("ACW state). There is a corresponding concept associated with voice calls in a contact center, wherein the agent completes a voice call and must then finish various work items associated with the just completed call (such as completing resolution of a customer's complaint). Similarly, after a text message interaction (i.e., text session), the agent may have to perform various activities after the completion of the session before accepting a new session. Hence, the agent enters the ACW state for a limited time to complete resolution of various work items. Once those are completed, the agent then transitions to the available state 210. Although this state could be called an "after session work" state, the term ACW is well known to those skilled in the art in the context of voice calls.

FIG. 2 also illustrates how the transition from one state to another can occur. This is described in the form of an input/output action. The input is characterized as to what type of message is sent/received, and the output is the action involved with a response timer. The input/output action is delineated by the use of the "/" symbol separate the input that causes the state transition and a corresponding output action on the timer. For example, the input/output action 202 indicates that the agent moves from the available state 210 to the allocated state 220. The input triggering this involves receiving and routing an incoming text message to the agent. The output action indicates that an "agent initial response timer" is started. This timer is used to ensure that the agent response to the incoming message.

Once in the allocated state 220, the agent can perform various actions. Some will cause the agent to remain in the same state or transition to another state. For example, input/output action 204 reflects the agent explicitly rejecting the incoming text or ignoring the text. In this case, the agent transitions back to the available state 210 and the agent initial response timer is stopped and reset. The agent is now available to receive another new text.

Instead of rejecting the text (which presumably rarely occurs), the agent in the allocated state 220 may also send a canned response message to the customer or may explicitly pause a customer response timer as shown by input/output action 206. The selected canned response is configured to cause the customer response timer to be pause; hence the output action result is that the customer response timer is paused. This timer is used to determine when the customer has effectively ended the current session. The result of this input/output action is that the agent remains in the allocated state 220. Alternatively, the agent may compose or select a canned message that is sent in input/output action 212, which causes the customer response timer to be reset and restarted. The agent remains in the allocated state 220. Thus, these actions reflect that the use case wherein the agent is responding and interacting with a customer. During this time, the agent is considered as being in the allocated state.

A distinction between the input/output actions of 206 and 212 is that a canned message may be configured to pause the customer response timer automatically when sent (as in the case of 206) or it may cause the customer response timer to be reset and restarted (as in the case of 212). This is configurable on a per-canned message basis. On the other hand, when an agent composes and sends a message (as in the case of 212), the timer is reset and restarted. However, that action returns the agent back to the allocated state 220 and the agent can then immediately pause the timer (as in the case of 206).

Once the agent is in the allocated state 220, the agent may transition to the ACW state 230 when the customer response timer expires provided the communications handler is configured to place the agent in the ACW state as reflected by input/output action text 214. Essentially, the ACW state reflects the situation where the agent was interacting with a customer, sent a response to the customer, and the customer considers the session as completed and does not respond further to the agent. After the customer response timer expires, the communication handler considers the session as completed. In one embodiment, the communications handler is configurable to either return the agent to the available state 210 or the ACW state 230. In this particular example, when the customer response timer expires in the input/output action 214, the agent is placed in the ACW state 230. Once the agent is in the ACW state 230, the agent can only return back to the available state 210. This can be done by the agent explicitly indicating/requesting to be returned to the available state as reflected in input/output action text 218. In other embodiments, there may be a timer running that will return the agent to the available state if the agent does not manually request to be returned. In both input/output actions 214 and 218, any agent response timers or customer response timers are reset and stopped. If the communications handler is configured to return the agent to the available state directly in input/output action 216, then the agent is returned to the available state 210 when the customer response timer expires.

To recap at a high level (and glossing over selective exception use cases), FIG. 2 illustrates that an agent that is not handling a session is available to be assigned to a session. An incoming text allocated to the agent places the agent in an allocated state, i.e., they are assigned to a session. Assuming the agent does not explicitly reject the session or ignore the message, the agent will respond by sending a text. Depending on whether a canned message is sent that is configured to pause the timer or an agent generated message is sent, then this action may pause the customer response timer or it may allow the customer response timer to run. The agent may also be able to manually pause the timer itself if it is running, independent of sending a message. The agent normally remains in the allocated state until the customer response timer ends, which signals the session ending. In some embodiments, the agent has an unlimited time to respond once a session is started, but the customer will be limited by the customer response timer (assuming it has not been paused). Once the customer response timer expires, the agent is placed in either the after-call work state or the available state, based on a configuration parameter. If placed in the ACW state, the agent will then transition to the available state once the work is completed and the agent exits the ACW state.

Not all implementations will allow the agent to reject an initial message or fail to respond to the initial message, thus returning the agent to the available state. This may be abused by the agent, by allowing them to reject incoming messages. Thus, some embodiments may not allow the agent to control whether they transition out of the allocated state. Normally, the agent exits the allocated state only when the customer has ceased to respond, which occurs when the customer response timer expires.

The expiry of the agent response timer reflects an agent that has not initially responded to a customer. It is expected that in most cases, an initial customer text that is received should be acknowledged in some way. Thus, in most cases, the agent receiving the initial text should respond to a customer's text, even if the nature of the text is such that the customer is not expecting a response. In some embodiments, the agent response time may be configured to restarted upon receipt of every customer text message, but with a different value for the initial customer text message as opposed to subsequent text messages in the session. For such subsequent timer values, the agent response timer value should be longer than the customer response timer value, otherwise the session may be prematurely ended.

The same state diagram of FIG. 2 can be easily adapted to accommodate an agent handling more than one session. If so, the criteria for being available is that the agent has not exceeded a threshold number of simultaneous sessions. The above discussion presumed that the limit was one (a single session), but in many applications, that agent will be able to handle several sessions simultaneously. From an illustrative perspective, each session may have its own corresponding state transition diagram that is started if the agent is allowed to handle an additional session.

The above illustrates how a customer response timer is defined to determine when a session is completed. It also illustrates how an agent can control the customer response timer, allowing the agent to pause the timer. This allows the agent to inform the customer that additional time is needed to fully address the customer's inquiry. In some embodiments, an agent response timer may be defined so that it is started after each customer response is received. This may be used to ensure the agent responds to an initial customer text in a timely manner or inform a supervisor that an agent that is tardy in responding. Its frequency of expiry could be measured and used to rate the performance of the agent with respect to promptly responding to customer inquiries. An agent that is frequently tardy in responding to an incoming text would have a higher frequency of the agent response timer expiring.

When the customer response timer does expire, the agent is returned to the available state (directly or via the ACW state) and the session is viewed as ended. The agent is aware of the timer value, as it may be displayed in a dialogue box. Once expired, the user interface removes the dialogue, since the session has ended. It is possible that the customer was merely delayed in responding and continues the dialogue by sending in a text. The message sent by the customer after the session is viewed as having ended is received by the communications handler and is treated as initiating a new session. In some embodiments, efforts will be made to route the message for this new session to the same agent. Thus, even though the communications handler views the customer text as beginning a new session, the agent may recognize that it is part of a continuation of the prior session. Consequently, the agent is provided with appropriate tools to then review the prior dialogue with the customer, so as to be familiar with context.

Process Flow

Figure 3:
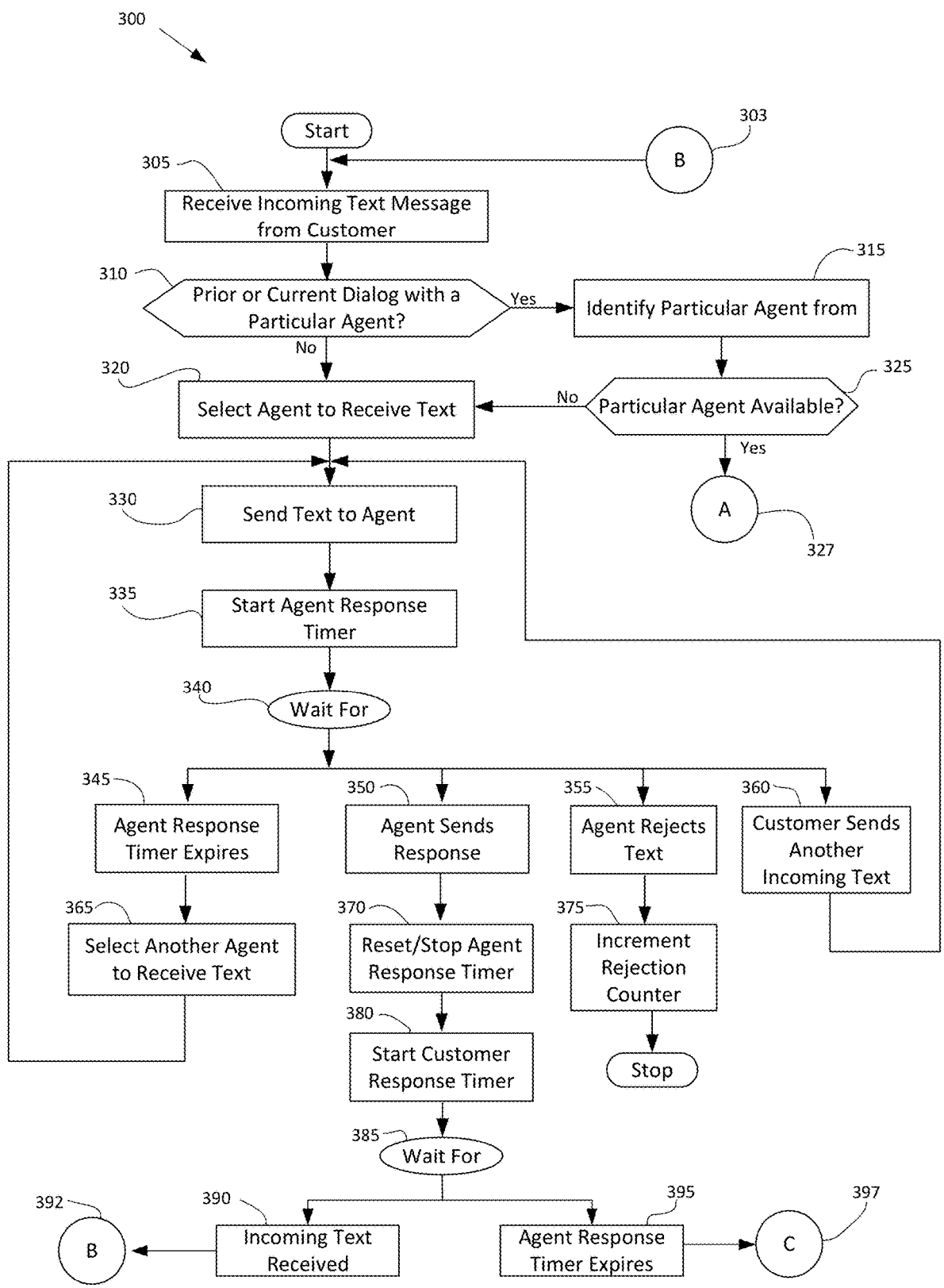
FIG. 3 illustrates one embodiment, in part, for processing an incoming text from a customer in a communications handler in a contact center.

Turning to FIG. 3, a process flow 300 is shown that illustrates one embodiment of how an incoming message from a customer can be processed by the communications handler. The process begins with the receipt of a customer text message in operation 305. Each text message will include a calling mobile telephone number of the caller ("customer") and it will be directed to either a short code or a 10 digit telephone number. Based on examining the calling party number in operation 310, a determination is made whether the customer previously had or currently has a session with a particular agent. While there may be a slight preference to selecting the same agent that handled a prior session with the customer, there is a strong preference to selecting the same agent for continuing a current session. Only in usual circumstances should the agent be changed when receiving a text for an ongoing session. The preference for selecting the same agent handling a prior session may be a function of the time since the last session ended. That is the more recently the last session ended, the stronger the preference to select the same agent. For example, the calling number may be checked to see who was the last agent (if any) in which there was a dialogue in the past 24 hours. Or, the last agent regardless of time could be ascertained and selected if available.

Certainly, if there is an ongoing dialogue between the customer and an agent in operation 310, that agent will be readily identified in operation 315. At that point, a determination is made whether that particular agent is available in operation 325. Likely, if the dialogue is an ongoing session, then that agent will be available. It is possible that the agent has logged out or is otherwise unavailable. If that agent is available, then the process continues at label A 327, which continues on FIG. 4. If the customer last spoke to e.g., Agent A several hours ago and the session was deemed ended, then if the customer initiates a new session, then preference may be given to routing the text to Agent A at operation 310, 315. However, it is possible that in operation 325 that Agent A is on break, has ended their shift, or is otherwise unavailable to receive the incoming text, in which case the process continues at operation 320.

If there is no particular agent identified in operation 310 or the particular agent identified is unavailable, then the communications handler proceeds to operation 320 where an available agent is selected to receive and handle the incoming text.

The description of the above steps serves in part to distinguish the first message from a customer for a new session from a subsequent message in that session. This is because in some embodiments the process flows distinguish between how an agent responds to the initial text of a session from the on-going dialogue in a session. At operation 320, it is presumed that the agent to receive the initial text of a session has been identified.

The process then continues and sends the customer text to the selected agent in operation 330. An agent response timer is started in operation 335. This may have a value that is unique for the agent responding to the initial text as compared to the agent responding to subsequent texts in a session. The agent response timer is used to ensure that the selected agent responds in some manner after receiving the initial text. This aspect is not present in all embodiments.

Next, the operation 340 is a "wait for" operation indicating the communication handler waits for one of the following events or actions to occur. Only one of the following events is presumed to happen first (i.e., there no accounting for a 'tie' in the events occurring). The first possibility (shown in particular order) is shown in operation 345. This reflects that the agent does nothing in response to receiving the incoming text (i.e., ignores the message). Eventually, the agent response timer will expire as reflected in operation 345. This can be viewed as an error procedure as the agent should not normally ignore incoming text messages from a customer. In response to this situation, the communications handler selects another agent to receive the text in operation 365. Essentially, the communication handler can be viewed as "pulling back" the text message from one agent and sending it to another available agent. There may be suitable logging and counters that track how frequently this occurs for a given agent. The agent may be forced to ignore an incoming text under certain circumstances and tracking the frequency of its expiry may signal when the agent is too busy with other sessions or is not performing up to expectations.

Another possible event that the communications handler detects at operation 340 is that the agent responds to the incoming text as reflected in operation 350. This is a likely and expected event. In this case the agent (as expected) responds in some manner to an initial text message from a customer. In some instances, the customer's text message may not always warrant a response, but in this embodiment, it can be deemed good customer service policy to at least acknowledge receipt of a customer text. The agent can generate a response either by composing a message and sending it, or by selecting a pre-written ("canned") message to be sent. Thus, in the normal use case, the agent should be responding to the text in some manner. Once this occurs, the process continues to operation 370 which causes the agent response timer to reset and stop. Because the agent has responded, the customer response timer is started in operation 380. In some embodiments (which is not reflected in this process flow) the canned message may be configured to pause the customer response timer. Essentially, the agent is now waiting for the customer to respond (even if in the context of the prior agent response no customer response is expected).

The process then continues to the "wait for" operation 385 which waits for one of two events. First, if the agent response timer expires in operation 395, the process continues to label C 397, which continues in FIG. 4. Essentially, the session has completed and the agent may transition to an after-call work state, or return to the available state. One way that the agent response timer does not expire is if a response is received before its expiry. If an incoming text is received in operation 390, then the process proceeds via label B 392 by looping back up to operation 305 where it shows the processing of an incoming text.

Another possible response by the agent after receiving an incoming text is to reject the text in operation 355. This again represents an unusual use case as in most instances when the communications handler has determined the agent is available and able to handle an incoming text for a new session, the agent will accept it (i.e., not reject the message). However, in certain circumstances the agent may be allowed to reject it. For example, the agent may be required to log-off for a health break, training break, or for some other reason where the agent is aware that they will not be able to service that session. If this action is allowed, then communication handler will then reroute the text to another available agent. If the agent does reject the text, then the communication handler in operation 375 will increment a rejection counter for that agent, so that the frequency of such responses by that agent can be tracked. A high number of such rejections may be an indication that further training of the agent is required or there is some other underlying issue to be addressed.

Finally, another event occurrence is shown in operation 360. This again represents an unusual use case. The customer may have sent the text referenced in operation 305, and before the agent can respond and before the agent response timer expires, the same customer sends in another message to the agent. In this case, the process flow loops back to operation 330 where the new message is sent to the same agent, and the agent response timer is restarted.

The above set of flows generally pertains to processes applicable to the first receipt of a customer's text message, as there may be some unique aspects associated with beginning a session. Assuming the session comprises a series of back-and-forth text messages from the agent and the customer, the second and subsequent text messages from the customer will be received at operation 305 and a determination will be made that the message is part of a dialog with a particular agent in operations 310, 315, and 325, where the processing will continue via label A 327 on FIG. 4.

Figure 4:
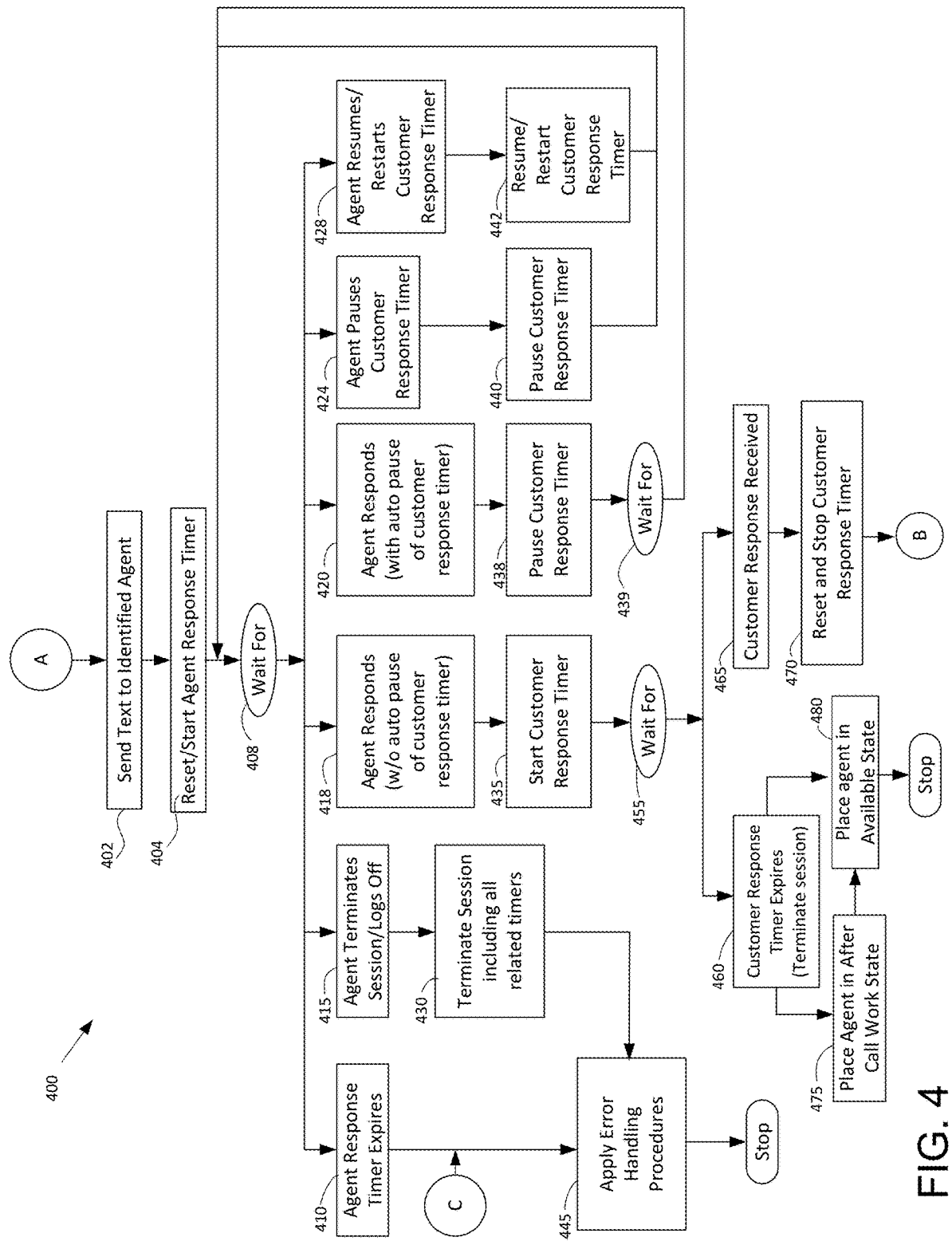
FIG. 4 illustrates one embodiment for processing events after receiving an incoming text from a customer in a communications handler in a contact center.

Turning to FIG. 4, the process 400 picks up with the customer's subsequent incoming text being send to the identified agent in operation 402. This agent usually would be the same agent that handled the start of the session. An agent response timer is reset and started in operation 404. This may have a different value than the agent response timer associated with the initial customer message. At this point, the communications handlers waits for one of the identified events to occur in operation 408.

If nothing else occurs, then in operation 410 the agent response timer will expire. This reflects the situation where an incoming text was routed to the agent and the agent essentially ignored it. There are a number of error handling procedures that could be defined in operation 445. The agent could be warned of a pending text that requires a response, the agent's supervisor could be informed, the condition could be logged, or the text could be rerouted to another agent. Presumably, the agent will not be ignoring too many customer texts, and a variety of error handling responses may be configured.

Another event that could occur, albeit infrequently, is that after receiving an incoming text, the agent could terminate or log-off in operation 415. This could occur if the agent was forced to prematurely terminate the text session (as well as all other sessions). If so, then the process could proceed to operation 445 where appropriate error handling procedures would be applied. Likely, these procedures would incorporate aspects of rerouting the text to another agent by establishing a new session with another agent.

Another event that may occur is shown in operation 418. In this case, the agent responds in some manner to the customer's text, which may include either generating a text or selecting a pre-canned message as a response. In this flow, the agent's response causes the customer response timer to be started. A common application of this flow is when the agent sends a text to the customer and expects the customer to respond. In other words, the agent does not expect to be sending another follow-on text to the customer. Rather, the customer is expected to respond and consequently the customer response timer should be started and running in operation 435.

At this point, there are two expected outcomes which the communications handler waits for at operation 455. First, the customer does not respond, and if so, then the customer response timer will expire in operation 460. This timer delineates the end of the session, and a failure of the customer to respond prior to the expiry of the timer is construed as the end of the session. Based on how the communications handler is configured, the agent will with be placed in an after-call work state in operation 475 or in the available state in operation 480. If the agent is placed in the after call work state in operation 475, it is possible that another timer could be running, which would transition the agent to the available state in operation 480. It is not expected that the agent should be allowed to remain in the after-call work state indefinitely.

The second possible outcome at operation 455 is that a customer response is received at operation 465. If so, then the session continues by resetting and stopping the customer response timer in operation 470. The process then loops back up to operation 305 of FIG. 3. There, the text is sent back to the same agent handling the session, if available.

Similarly, another event that is likely to occur at operation 408 is shown in operation 420. In this case, the agent sends a response, which can be a pre-canned message, but which results with the customer response timer being paused in operation 438. A common application of this is when the agent knows that a follow up message is required. For example, the customer's incoming text routed to the agent may inquire about an uncommon problem. The agent may respond with "I will have to check on that—please wait." The agent knows that the customer is not expected to respond and will wait. Further, that canned message can be configured to pause the customer response timer. Consequently, the agent knows that it would be inappropriate to have the customer response timer running and hence the agent will cause it to be paused by sending the canned message that is configured to pause the timer. At this point the communications handler will wait at operation 439 for a response corresponding to one of operation 415, operation 418, operation 420, or operation 428.

Typically, the next event occurring will be the agent sending a response that starts the customer response timer. Thus, a common follow up to the agent sending a message that pauses the timer is to then send a follow up text where the timer is started. Thus, after the agent has had time to research the customer's inquiry, a response will be sent, and causing the customer timer to start reflects that the customer is expected to respond. Of course, if the customer does not respond after that, then the session will terminate eventually due to the customer response timer expiring.

Returning to operation 408, another event that can occur is that the agent merely pauses the customer response timer in operation 424. This may occur after the agent sends a response in operation 418 (which does not automatically pause the customer response timer). However, the agent realizes that as the timer is counting down, the customer may need more time. Rather than allowing the session to terminate, the agent may manually pause the customer response timer. If so, the timer is paused in operation 440 and the process returns to operation 408. Returning to operation 408, another event that may occur is that the agent resumes the paused agent response timer in operation 428. Obviously, this can only occur if the timer was previously paused.

The process flow of FIG. 4 shows at a high level some of the process flows that may occur. It should be evident that some of the events which the communication handler waits for at operation 408 may be limited or otherwise restricted. For example, the event of resuming a paused timer cannot occur if the timer was not previously paused. Similarly, if the agent responds in operation 420 such that the customer response timer is paused, then when looping back to operation 408, it is not possible for operation 410 to occur (Agent Response Timer Expires). However, FIGS. 3 and 4 are sufficient to illustrate to one skilled in the art how controls can be defined in the context of a text message exchange so as to define text sessions between an agent and a customer.

The exact value of each of the timer values will vary based on context and application. For some applications, such as customer retail servicing, the certain timers, such as the customer response timer may have a comparatively shorter value, whereas for technical support servicing, the corresponding timers may have a comparatively longer value. The need for longer timer values may reflect the longer time it may take for the text message interchange to occur between parties. In some embodiments, the customer response timer may be set for 20-60 minutes.

Agent Graphical User Interface for Displaying Customer Texts

Figure 5:
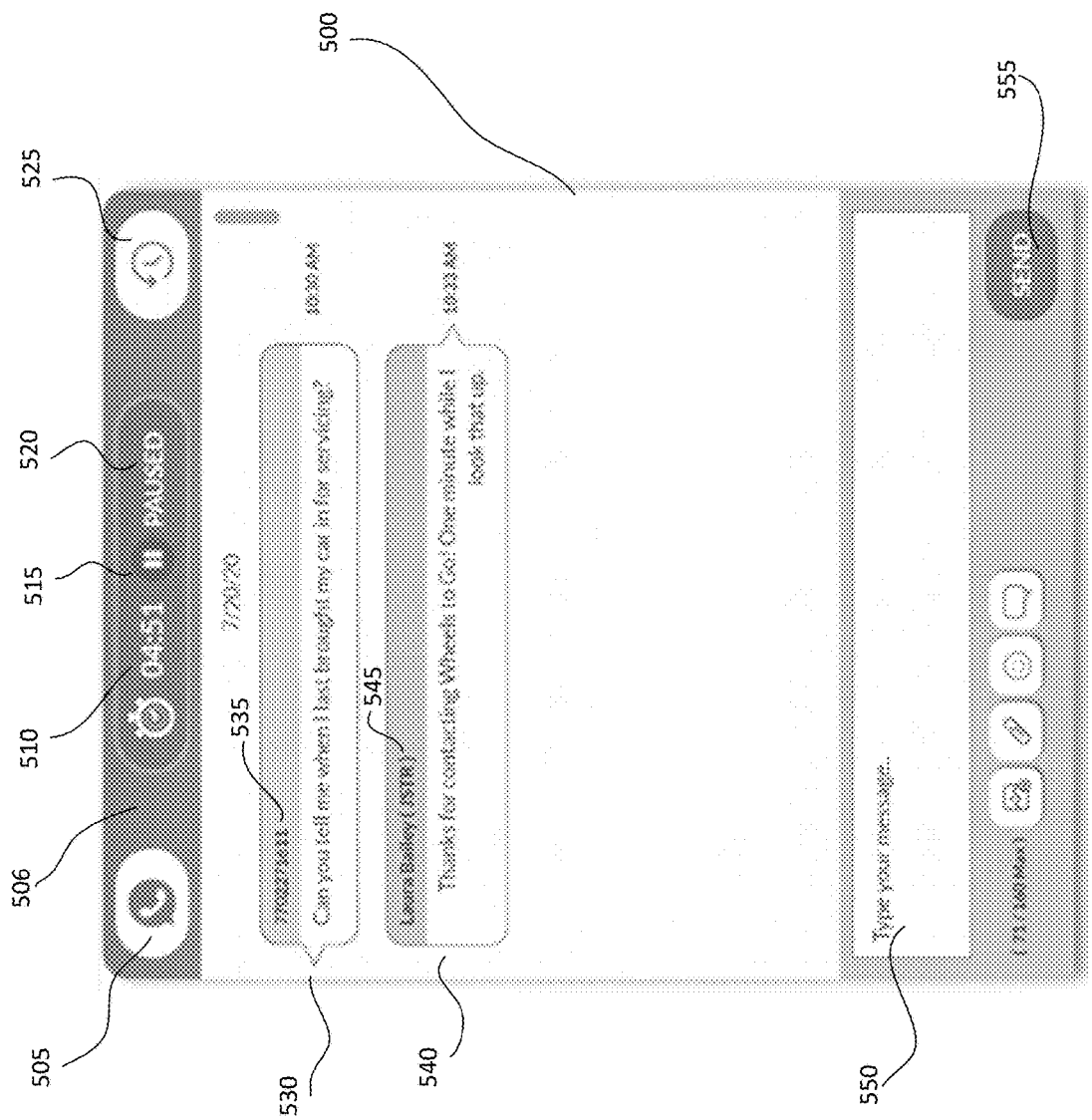
FIG. 5 illustrates one embodiment of a dialogue box presented to an agent for interacting with a remote party during a text session.

In one embodiment, the texts comprising a session are displayed to the agent in a scrolling chronological manner using a text dialogue box, with the most recently displayed text shown on the bottom. One embodiment of an agent's display comprising the text dialog box is shown in FIG. 5. Turning to FIG. 5, the text dialogue box 500 comprises the texts sent and received by the agent, displayed in chronological order. For example, the customer text received 530 may be displayed in one color, with a customer identifier 535 comprising a telephone number. Below is the agent's response text 540, which comprises the name 545 or other form of identifier of the agent, which may be displayed with another color.

The text dialogue box also includes a header portion 506 that includes an icon 505 indicating the dialogue box pertains to a text session (as opposed to, e.g., a chat or email dialogue). The header portion 506 also includes a countdown timer 510, which represents the customer response timer value. The customer response timer informs the agent how long the customer has to respond (assuming the timer is counting down) before the session will be considered as ended by the communications handler. Other embodiments may also include an agent response timer (which is not shown in this embodiment). The status/control icon 515 indicates the status, along with the text-based status 520. The agent can select the status/control icon to pause or resume the customer response timer. A history icon 525 allows the agent to see prior sessions involving the same customer. The prior sessions may involve the same agent or a different agent. At the bottom of the text dialogue box 500 is a text-input area 550, where the agent can type their response, review it, and then upon selecting the send icon 555, the text is sent to the customer, and it will then appear in as a text in the session displayed in the text dialogue box 500. Typically, sending the text will cause the countdown timer 510 to reset and restart.

Figure 6:
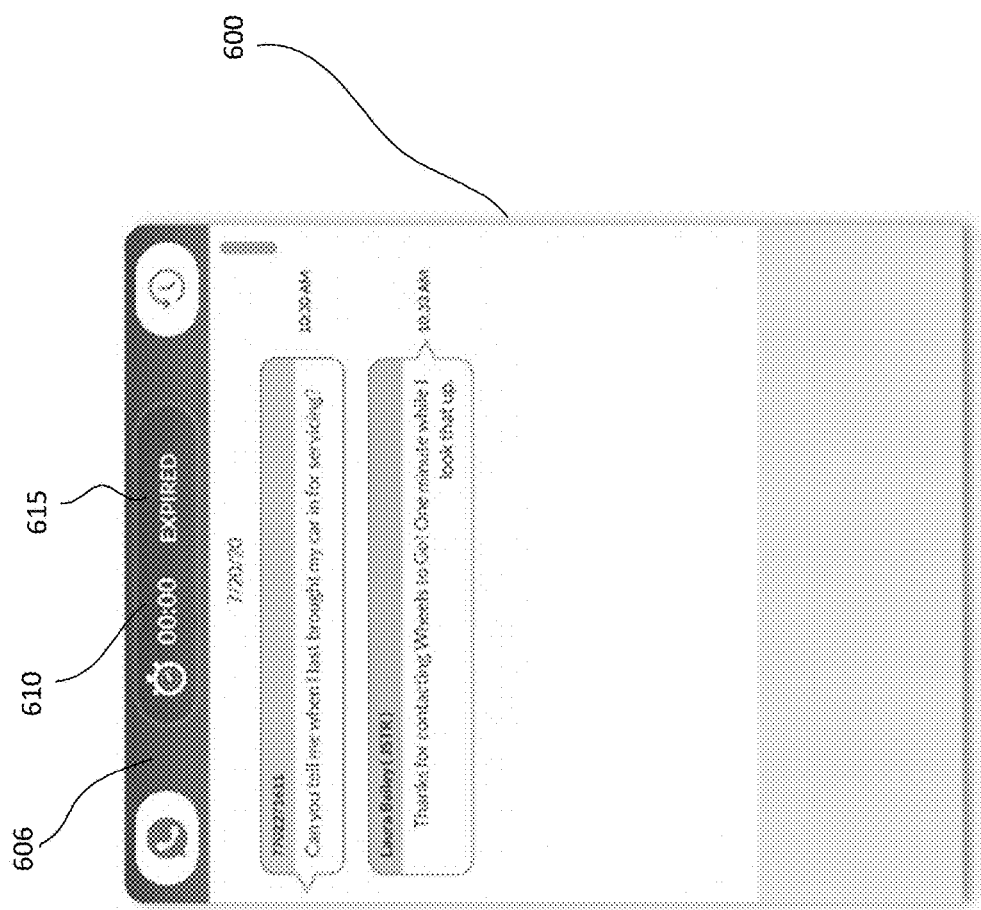
FIG. 6 illustrates one embodiment of a dialogue box presented to an agent wherein an expired customer response timer is displayed.

Turning now to FIG. 6, this illustrates one embodiment of the agent interface 600 when the customer response timer has expired. The header portion 606 has changed color to indicate a change in status to the agent. The countdown timer 610 reflects a value of zero, and the status text 615 reflects the expired status. The icon for pausing/resuming the customer response timer is not shown, because the function is no longer available to the agent when the timer has expired. At this point, the session has ended and the agent may be placed in an after-call-work state or returned to the available state to handle a new text session. The communication handler will then consider the associated text to/from the agent and customer for this session as a logical grouping comprising a session. This will be indexed and can be searchable based on the time when the session spanned, the customer involved, or the agent involved.

The agent may close the dialogue box 600 at this point or the communication handler may close it for the agent. Once closed, the agent will no longer see the text messages that comprise the session. The same customer may initiate another text shortly thereafter, perhaps with a follow up question. In this case, the receiving agent may find it useful to inquire about the prior sessions with that customer, particularly if the current agent selected is different from the prior art. As discussed earlier, an agent can select the history icon 525 to review recent sessions, in reverse chronological order. After selecting this icon, the agent may be presented with the agent interface shown in FIG. 7.

Figure 7:
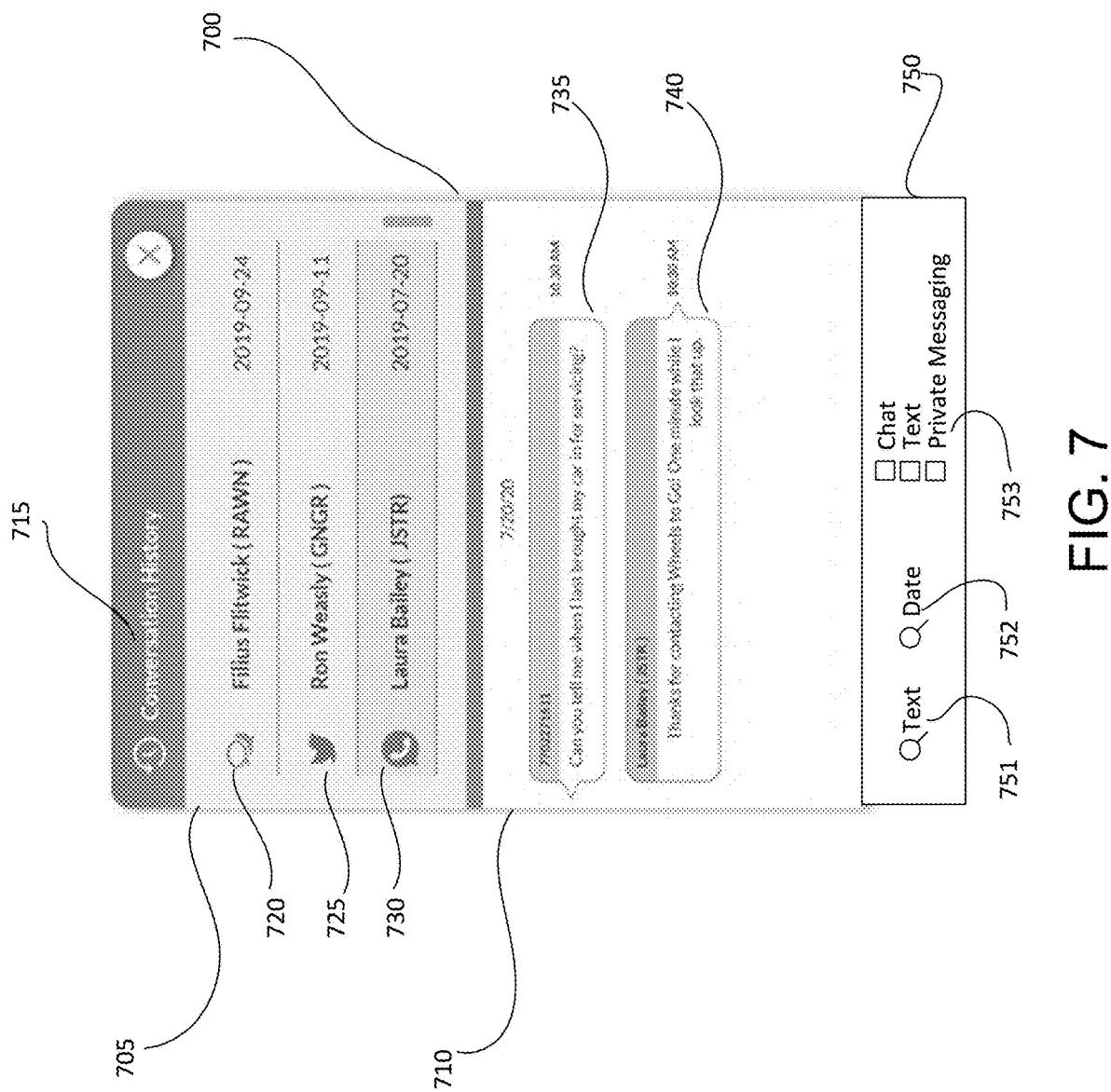
FIG. 7 illustrates one embodiment of a dialogue box presented to an agent after the agent has requested to view a history of prior sessions with that remote party.

Turning to FIG. 7, another embodiment of an agent graphical user interface 700 is shown after the agent has selected to view the prior history for that customer. The top banner 715 reflects that this is the conversation history, and the top portion 705 includes various prior session summaries and the bottom portion 710 includes the text from the most recent session. The top portion 705 shows, in this embodiment, three prior sessions with three different agents. The oldest prior session 720 was a chat session as indicated by an icon, followed by the name and identifier of the agent, and a date. The second session 7s25 involves a private commercial messaging service, as indicated by the icon, and indicates the agent's name, identifier and also the date. Similarly, the third session 730 shows the most recent session, which the icon reflects is a SMS text session with agent Laura Bailey on Jul. 20, 2019. The bottom portion 710 shows the last two texts of that session including the initial text 735 from the customer, which is identified by the telephone number and includes their text message. The next text 740 shows the agent's response. Suitable controls for scrolling chronologically through the various texts in a session or the various sessions may be made available, so that the current agent can readily review and select any past sessions.

The user interface 700 may also include various controls in a control panel portion 750. These controls may allow the agent to search for text 751 in one of the prior sessions. Upon selecting the icon 751, the agent will enter the word or phrase to be searched, and the communication handler will identify the occurrences of that word/phrase in prior sessions. The agent may search by date or time period, by selecting another search icon 752. Upon selecting this icon, the agent is presented with options to indicate a date or date range, and all prior sessions within that time period are displayed. Finally, the agent may also select on of the channel type indications 753 to limit viewing prior sessions associated with a chat session, a text session, or one of the various private messaging services available to users.

Creating Customer Session Tables

The use of the various aforementioned timers allows the delineation of sessions for a series of texts from a customer. However, it is also necessary for the communications handler to also generate various data structures to facilitate identification of text messages that are associated with a given session. Without implementation of such data structures, the communication handler would have to recreate the various sessions each time that a review of past sessions was requested by an agent. Recreating the various sessions each time that an agent requested to review the history would be time consuming and inefficient, so the incorporation of these data structures improves the operation and efficiency of the communications handler.

Figure 8:
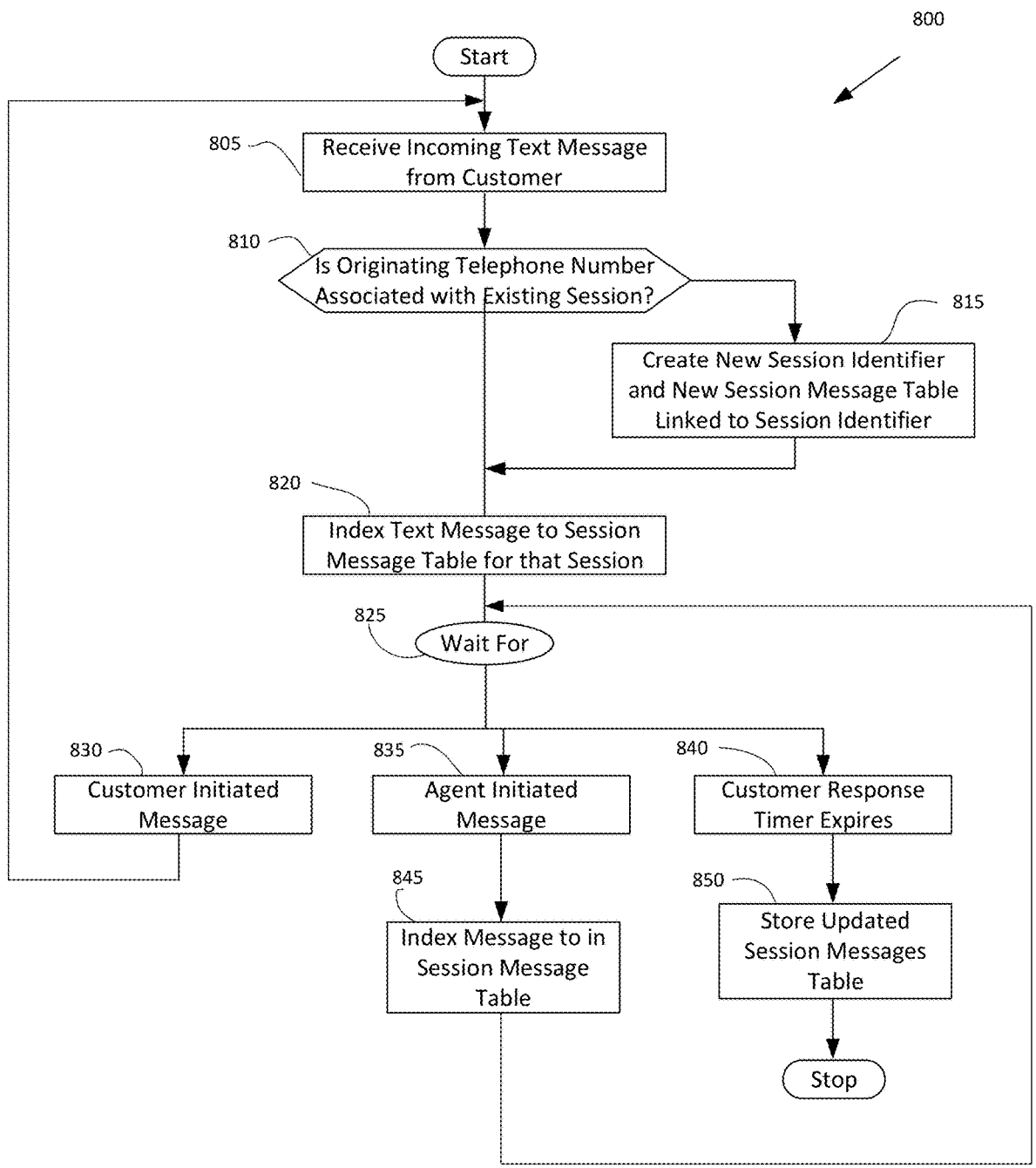
FIG. 8 illustrates one embodiment of a process flow for generating various data structures for identifying text sessions associated with a customer.

A process illustrating one embodiment of how these data structures can be generated and updated is shown in FIG. 8. Turning to FIG. 8, the process 800 begins with receiving an incoming text message from a customer in operation 805. A test is made in operation 810 for each message to determine whether this message a part of an existing session involving the customer (as identified by their originating mobile telephone number) or whether the text is the initial message of a new session. If the message is the beginning of a new session, then a new session identifier in a session table is generated that links the session to the customer's telephone number in operation 815. A new session messages table is then created, which will identify the messages associated with this session.

If the text is already part of an existing session, then, the process continues to operation 820. This is also where the process continues after creating the session message table in operation 815. The text message itself is indexed into the session message table for that session in operation 820. In summary, if the text is a new session, then a new session identifier is created and the text message is indexed as a first message of that session. If the text is part of an existing session, then the text message is indexed into the existing session.

Next, the process waits for an event to occur at operation 825. One of three events will occur. First, a customer-initiated message may be received in operation 830. If so, the process loops back to operation 805 and the message is processed as described earlier. The next event that may occur at operation 825 is that a message may be initiated by the agent in operation 835. If so, then this message is indexed into the session message table for this session in operation 845. Thus, both incoming customer messages and outgoing agent responses are indexed in a table (the session message table) that tracks the messages for this session. The process then loops back to operation 825 where the next event occurrence is waited for. Finally, the last event that may occur is that the customer response timer expires in operation 840. At this point, the session has ended and the updated session messages table can be stored in operation 850.

Figure 9:
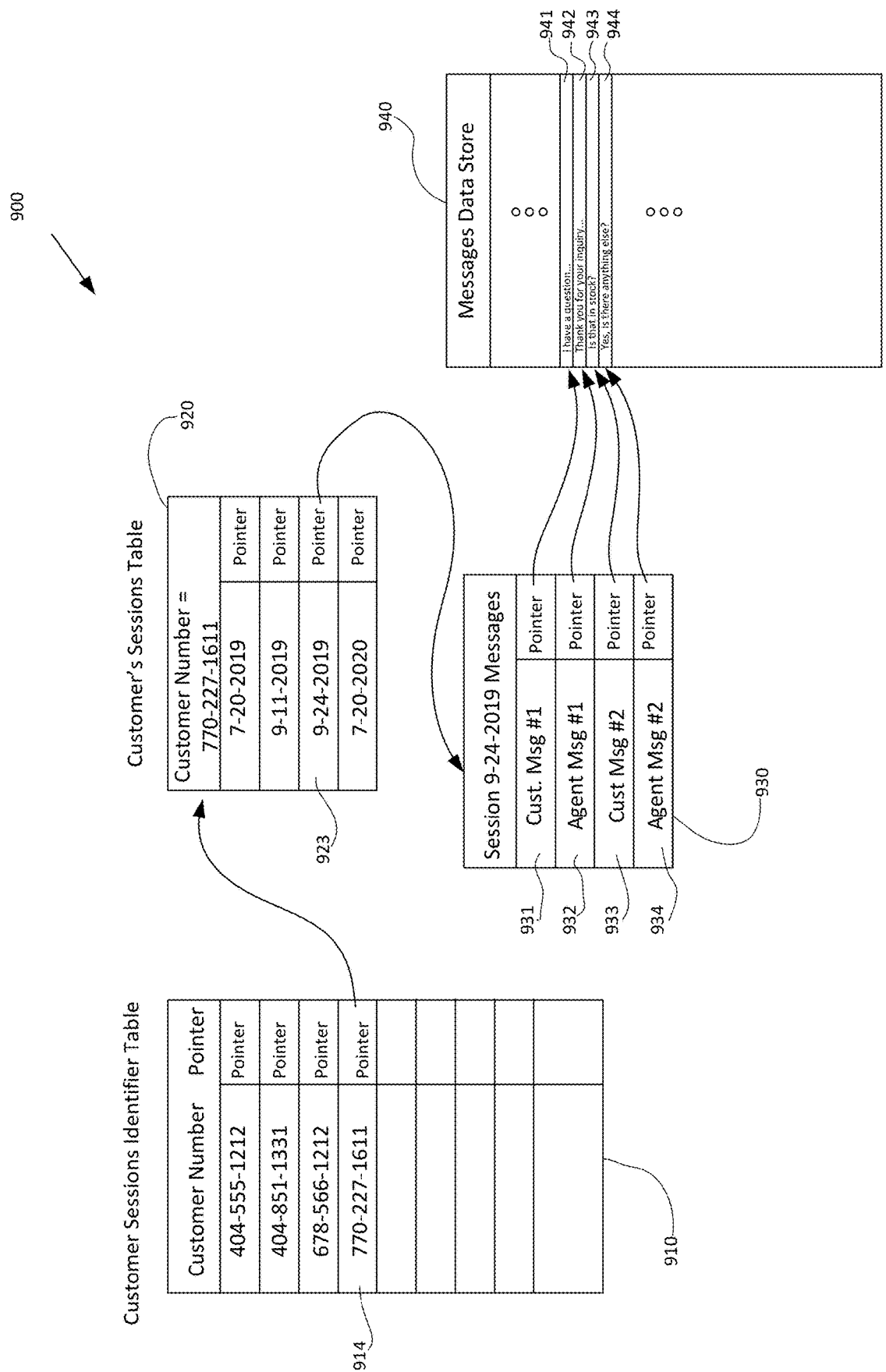
FIG. 9 illustrates one embodiment of the various data structures used for identifying text sessions associated with a customer.

Turning to FIG. 9, one embodiment of the various session-oriented data structures is shown. This data scheme 900 can be implemented using various data structures and techniques. The first table described is the customer sessions identifier table 910. This table identifies the various sessions that a customer has initiated with the contact center. This data structure is indexed by the originating telephone number of the customer, which is included in each text sent by the customer.

Each record will include a pointer which will link to a table that tracks each of the sessions of that customer. The data structure that defines a particular session is the customer's sessions table 920. This table is unique for each customer and each record represents a distinct session. In this embodiment, this table does not store the messages of the session itself, but points to a session message table 930 which tracks the number of messages, their order, and whether the message was sent from the agent or customer. This table 930 in turn points to the individual messages maintained in a messages data store 940. The messages data store 940 stores all the text of the messages for all sessions.

To illustrate how these structures are used, consider the dialogue box 700 of FIG. 7 viewed by the agent. There, a current dialogue is shown involving an agent ("Laura Bailey") interacting with a customer identified by a telephone number ("7702271611"). There are three prior sessions shown 720,725,730 involving that customer, though the contents of each session is not shown on this screen. The agent may be able to select a session to review and the messages for that session can then be displayed to the agent.

Returning to FIG. 9, it is seen that in the customer sessions identifier table 910 there is a record 914 for a customer with that telephone number. Thus, the existence of a record for this customer indicates that there is at least one prior session stored for this customer. The record includes a pointer to the customer's session table 920, which provides information for all the sessions with that customer. That table 920 which is for customer number 7702271611 shows there are four sessions. These are identified by date, which corresponds to the dates shown in FIG. 7. One of the records 923 is for a session that occurred on Sep. 24, 2019 and includes a pointer to the session messages table 930. This table 930 includes information on the messages for this particular session. There are four records 931, 932, 933, and 934 included for this session that represent the four messages that were exchanged. The first record 931 reflects the initiating customer message, the second record 932 reflects the agent's first response, the third record 933 reflects the customer's second message, and the fourth record 934 reflects the agents second response. There are no more messages associated with the session. Each record includes a pointer to a corresponding message 941, 942, 943, 944 in a messages data store 940. Thus, the records in the session messages table allow retrieval of the individual text messages. The messages data store may be a chronological data store of all the messages processed by the communications handler. While the four messages are shown in sequence in the messages data store 940, it is quite common that intervening messages will have occurred and will be stored. Hence, although the messages for the session are shown contiguously, in many embodiments that may not be the case.

Thus, use of these data structures allows it to be relatively easily ascertained whether a given customer has any prior sessions. For example, it can be readily ascertained from the customer sessions identifier table 910 whether a customer has prior sessions. If there are no prior sessions for a customer, then the history icon 525 may be displayed in a gray-out manner or not presented at all, and this would immediately inform the agent that customer does not have a prior history. Hence, there is no need to invoke the history icon 525 in order to ascertain there is no history. Furthermore, the communications handler does not have to process all of the records in the messages data store to ascertain there are no prior sessions. This allows the communications handler to quickly ascertain whether and how to display the history icon without extensive processing. Recall that the messages data store may be quite extensive, as the contact center may store all the messages from customers for a number of years. Consequently, the processing effort saved can be significant and it allows a much faster response time for presenting the agent dialogue box to the agent.

Similarly, once a customer is found in the customer sessions identifier table 910, it can be readily ascertained how many and when the prior sessions occurred. Thus, in order to present the result of the customer invoking the history icon 525 and presenting the information in FIG. 7, the communications handler need only retrieve and process the customer's sessions table 920, and need not retrieve all the records in the messages data store 940 to display the information to the agent. Again, using these data structures reduces the necessary processing to display the dialogue box to the agent and allows it to be done significantly faster.

Finally, if the agent selects a particular session to review, the communications handler need only retrieve and process 930 to quickly identify which messages to retrieve. The alternative would be to process all the records in the messages data store to ascertain which messages were from the customer, and then to further process those messages to ascertain which were associated with a particular session. Again, using the data structures defined reduces the necessary processing to display the dialogue box to the agent and allows it to be done significantly faster.

Thus, it should evident that creation and updating these data structures avoids a tremendous amount of processing each time an agent inquires about the prior text messages sent by the customer in a prior session. This approach provides an efficient balance between creating additional tables when a new session is started in order to reduce the processing requirements in the future when retrieving and reviewing the sessions.

The data structure shown in FIG. 9 is exemplary, and other information could be included or structured in a different manner. For example, the customer's sessions table 920 could include additional information for each session record, such as the number of messages in that session, certain keywords included, the agent's name involved, etc. Similarly, additional information could be included in the other tables. However, this overall structure 900 illustrates how much of the information can be quickly accessed by the communications handler in order to support the identification and retrieval of sessions and their messages as requested by an agent. No doubt in light of this disclosure, those skilled in the art may devise variations of these data structures and processing techniques while adhering to the fundamental inventive aspects disclosed herein to more effectively retrieve and process session information for connectionless text messages between a customer and a contact center.

Limiting Text Presentation Based on Contact Windows

Contact windows, also called calling windows, defines a time period during which it is acceptable to contact or interact with a customer. This concept has its origins in voice telemarketing, and frequently comprises a default time period from 8:00 a.m. to 9:00 p.m. (local time of the called party) during which it is deemed acceptable for voice calls. Of course, many states may have regulations altering the specific allowable time period, but the concept is that there may be a time period that is deemed allowable to originate voice calls to a customer. This concept of a contact window can be applied to responding to text messages by a contact center from a customer. The restrictions apply to messages sent by the contact center, not from the customer.

The allowable contact window is determined based on the local time of the customer, not that of the contact center. Thus, if the contact center is located in the eastern U.S. time zone, and the customer is in the pacific U.S. time zone, there is a difference of three hours. Consequently, if the contact window opens at 8:00 a.m. local time in the pacific time zone, that means the communication should not originate before 11:00 a.m. in the eastern time zone. Otherwise, originating a call 8:00 (eastern) to a west coast customer would result in the customer receiving the communication at 5:00 a.m. It can be seen (particular for voice calls) why this is to be avoided. The determination of when the contact window opens depends on the local time of the customer, which can be ascertained using various information, which frequently includes the originating telephone number, an address of a customer associated with the originating telephone number (if known), or both. In some cases, the physical address of the customer is not in the same time zone as the telephone number (as determined based on a nominal location of the area code and central office code portion of the telephone number), and this is due to the growing prevalence of mobile telephone numbers being retained by users as they move across the country. Thus, a user may obtain a mobile phone number in Los Angeles, then move to New York, but retain the mobile phone number. Consequently, when there is a discrepancy in the time zone associated with the phone number and a corresponding address, the most restrictive assumption may be used.

The present invention pertains to text communications and not voice calls. Furthermore, the present invention focuses primarily on the customer initiating a text to the contact center, and the contact center responding or continuing a dialog. Even so, it can be appreciated that limiting communication responses from the contact center to the customer based on the contact window does apply to inbound communications from the customer. The restriction does not apply to the customer, as they can initiate communications to the contact center at any time. However, the restriction comes into play for responses from the contact center, i.e., when a response from the contact center would occur outside the contact window. There are two common situations. First, the customer may send a text outside the contact window in which case the contact center must decide whether to respond immediately of defer responding, which would likely be outside of the contact window. Second, the contact center may be involved in on-going dialog that may start during the contact window, but continue and extend to outside the contact window.

In the first case, the customer may send a text outside the contact window, e.g., at 3:00 a.m. Many contact centers do not operate 24 hours a day, and so the customer would normally not expect an immediate response. There may not even be an agent logged into the communication handler to which the text can be routed to. Once there is an available agent, the contact center can send the response to the customer in two ways. First, the contact center can send the text to an agent as soon as one is available, who then generates a response. If the response is outside the contact window, then the response is queued until the contact window opens for that customer. The second approach is to queue the incoming text message until the contact window opens, and then send it to an agent for responding. In summary, either the incoming text is delayed until a response would be within the contact window or the response is queued until the contact window opens.

Another situation that may occur is when an ongoing dialog occurs between the customer and the agent. Recall that the time between texts for SMS may be on the order of minutes or hours, unlike chat where the delay is frequently measured in seconds. Consequently, it is quite possible that a text dialogue may start at the end of the allowable contact window (but when the contact window is still open) and the customer sends a text to the agent just before it closes. Potential options in this case are to: (i) respond to the text after the contact window closes thereby continuing the dialog, (ii) defer sending the incoming text to the agent until the contact window opens, or (iii) defer any response sent by the agent until the contact window opens.

In some fact specific situations, it may be appropriate to respond immediately to the customer, even if the response occurs when the contact window has just closed. For example, if a customer sends a text withdrawing consent or otherwise requesting to opt-out from receiving texts, it may be appropriate to respond immediately. Frequently, such responses may be automated and are not generated by an agent. (More about this is discussed below.) However, because the context is fact specific, it can be difficult to determine for an agent to determine when it is appropriate to respond when the contact window has closed. Relying on the judgement of an agent may lead to undesirable outcomes or at best unpredictable outcomes.

The other option identified above is to queue the inbound text message until the contact window opens, and then route it to an agent to respond to. Generally, doing so presents a low risk that the response will be sent outside the allowable contact window. However, the risk is not zero. For example, consider an incoming text that is queued where the telephone number is in Hawaii-Aleutian time zone, but associated with customer that has an eastern-time zone address. In one approach, both the number and address are used to determine the allowable contact window, with the more conservative times used. Because there is a six hour time difference between the Hawaii-Aleutian time zone ("HST time zone") and the eastern time zone ("EST time zone", the contact window may be presumed to open at 2:00 p.m. EST, which is 8:00 a.m. HST. The contact window may be presumed to close at 9:00 p.m. EST, which is 4 p.m. HST. However, the contact center may be located in the central time zone ("CST") and may be staffed only until 5:00 p.m. CST. Thus, even the regulatory contact window may be a longer duration, the effective contact window for contact center for that customer is between 1:00 p.m. and 5:00 p.m. CST. If incoming texts are queued and presented to agents at 1:00 p.m. CST, it could foreseen that a larger than expected volume of texts would cause delays in agents responding in a timely manner. It could be envisioned that a session involving a customer and agent could involve a dialogue could span several hours. Thus, it is possible that a session that was delayed and started based on a queued incoming text message could extend to the end of the effective contact window. It is possible the agent's response to one of the texts could therefore extend past the allowable contact window. In this situation, the contact center should check an agent's response with respect to the close of the contact window and may queue it to the next opening of the contact window.

Returning back to the options available to a contact center when receiving an incoming text that is outside of the contact window, this same option could be used. That is, an incoming text could be sent to an available agent outside the available calling window, and the agent could respond, but the agent's response text is queued by the communications handler until the next time the contact window opens for that customer. Thus, even if the contact center instead queues incoming texts until the contact window opens, the contact center should still monitor responses, and potentially queue the responses to determine if the agent's response occurs at the end of the contact window. In one embodiment, no agent response is sent past the customer's contact window, and the operation of queuing an agent's response on this basis is termed "strict adherence." If strict adherence is enabled, then agent response will not be sent outside the allowable contact window.

In some embodiments, the communications handler may be configured to allow the agent responses for a session to be sent even if the contact window has closed. This can be configured to always allow an agent response to be sent (unqueued) or to queue an agent's response until the contact window opens at the next opportunity. If configured to queue responses, then the communications handler may be further configured to allow an agent to selectively manually override the outbound queueing on a per-response basis. This would allow the agent discretion in providing an immediate response to the customer, if deemed necessary. Alternatively, the communication handler may be configured to unconditionally enforce the settings, without any provision for agent override.

In summary, the communications handler may be configured to queue incoming texts that start or continue a session until the contact window opens. Separately, the communications handler may be configured to queue outgoing texts (agent responses) until the contact window opens. Both capabilities can be employed together. The communications handler may override strict adherence and allow agent responses to be sent even if the contact window for the customer is closed. This can be configured on a per agent basis for all sessions. In addition, the agent may be able override this restriction on a per-message basis within a session. In various embodiments, if strict adherence is applied, a warning message may be displayed to the agent informing them that contact window is limited and may even provide the agent with a countdown timer indicating when the contact window will be closed. This can inform the agent as to how quickly they respond and to the contents of their response. In some embodiments, an automatic message may be sent to the customer informing that the contact center will contact or continue the dialogue at a subsequent time.

Pre-Formulated Response Messages

An agent may have access to a library of pre-formulated response messages. These messages may be sent automatically by the communications handler, selected by the agent and sent as is, or these messages may be selected and then edited by the agent before sending. Each of these modes of operations can save time and effort by the agent as frequently much of the response information may be similar in content. This allows the agent to handle more simultaneous text sessions and reduce repetitious responses.

For example, upon receiving an initial customer text, the communications handler could automatically return a "welcome" response text to the customer and indicate that an agent will be responding shortly to their message. Alternatively, the agent could manually select and send such a "welcome" message. Or, if the customer sends a request when the contact center is closed, an automatic response message could inform the customer that a response message will be sent when the contact center has opened. This is an example of a common application of an automatically generated message.

The agent may select from a series of pre-generated or "canned" response messages that are then sent to the customer. Many customer inquiries may be routine, such as when a store location is open or when inquiring about directions to a location. In such instances, the agent may select a message from an indexed library of canned responses and have it sent. In other applications, the agent may select the message, and further edit it with information appropriate to the circumstances before sending it.

As a rule, messages generated (or edited canned messages) sent by the agent will cause the customer response timer to be reset and started. However, some canned messages may be configured to pause (or not reset and start) the customer response timer. For example, an automated "welcome" response text may be sent to a customer and configured to not start the customer response timer. The customer is not expected to respond to such welcome messages (e.g., "Please wait and an agent will respond to your text shortly). Hence, it would be counterproductive to start the customer response timer. Similarly, even if the welcome message was selected and sent by the agent (as opposed to automatically sent by the communications handler), it would not start the customer response timer. However, when the agent then responds in substance to the customer inquiry, then typically that response would start the customer response timer. Another application involves the agent responding to a customer inquiry where the context implies the agent will be sending a follow text. For example, the agent may respond with "That is a difficult question—it may take me a while to get the right answer." In that case, the message may be configured to not start the customer response timer.

Obviously, there are situations where the agent needs to send a text similar to the above example, but where there is no canned message. In this case, the agent may compose and sent a message and then manually cause the customer response timer to pause. Thus, either by selecting a canned response causing the customer response timer being pause or manually pausing the timer, there is no risk the customer response timer will expire while the agent investigates the inquiry.

Configuration of Features

Figure 10:
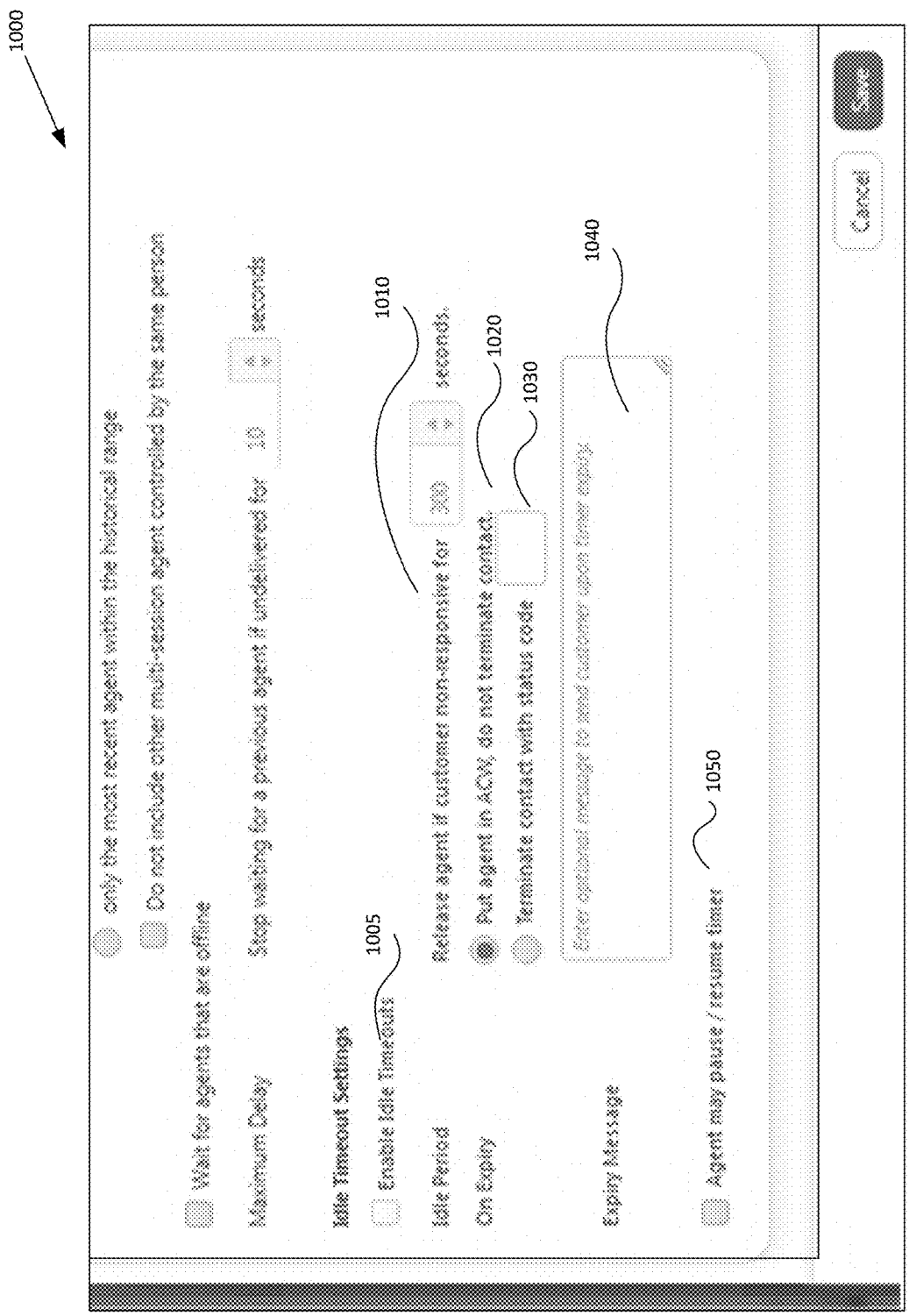
FIG. 10 illustrates an embodiment of a graphical user interface used by an administrator in configuring the service according to the various concepts disclosed herein.

FIG. 10 illustrates one embodiment of a graphical user interface presented to a supervisor or administrator for configuring the features according to the concepts disclosed herein using the computer 157 of FIG. 1. The configuration screen 1000 of FIG. 10 allows the administrator to configure the feature operation for an agent or a group of agents as desired.

One section of the configuration screen 1000 includes a portion for defining the idle timeout settings. The control box for enabling idle timeouts 1005 allows the feature to be disabled for an agent or group of agents. If enabled, the administrator would then define the idle period using a icon control for adjusting the number seconds 1010. This adjusts the customer response timer.

The next controls 1020, 1030 define the action to be taken upon expiry of the customer response timer. The first control 1020, selected via a radio button, puts the agent into the after-call work ("ACW") state. As discussed earlier, the session has ended, but the agent is not available to be allocated to a new session. The other control 1030 is to terminate the session thereby making the agent available for allocation to another session. The administrator can define a status code to be logged when this occurs. The status code is a value reflecting an aspect of the session for various business reporting purposes, and a unique code can be defined reflecting that the session was terminated because the customer response timer expired. The agent normally can indicate a status code for terminating the session in the ACW state, but because setting this control effectively bypasses the agent from entering the ACW state, the default value of the status code can be defined and the communications handler will use that value whenever the session is ended because the customer response timer expired.

The communications handler can also be configured to provide a canned message response to the customer via text box 1040. This message is automatically sent to the customer upon expiry of the timer. Frequently, this text message is sent to the customer to inform the customer that the contact center now considers the session has been completed. For example, the expiry message could be along the lines of "Thank you for your inquiry. If you have further questions, please do not hesitate to text us again."

Finally, a control 1050 is provided which authorizes the agent to pause and resume the customer response timer. Doing so allows the agent to ascertain when it is appropriate to suspend the timer, as illustrated previously. In some applications, the administrator may preclude the agent from exercising this capability, and hence the control can limit the ability of the agent to pause and resume the customer response timer.

Exemplary Processing Device Architecture

Figure 11:
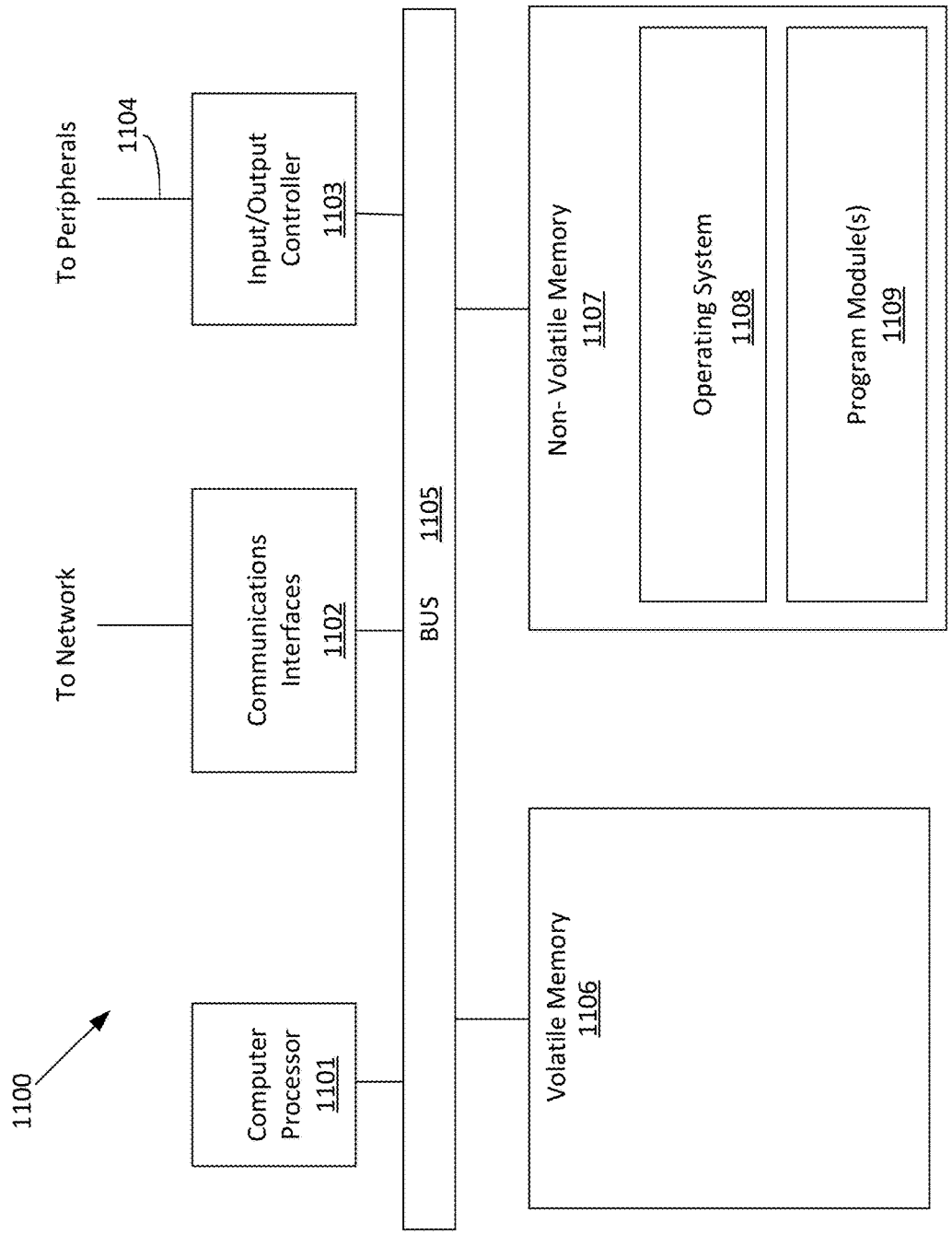
FIG. 11 illustrates an embodiment of a computer processing system used to provide the various technologies and concepts disclosed herein.

As discussed in conjunction with FIG. 1, the contact center architecture 100 may comprise various components. Accordingly, FIG. 11 is an exemplary schematic diagram of a computer processing component 1100 that may be used in various embodiments of the contact center architecture 100 to practice the technologies disclosed herein. In general, the term "computer processing component" may be exemplified by, for example, but without limitation: a various types of computers, servers, blades, gateways, switches, and the like, as well as any combination of devices or entities adapted to perform the functions described herein.

As shown in FIG. 11, the computer processing may include one or more computer processors 1101 that may communicate with other elements within the computer processing system 1100 via a bus 1105. The computer processor 1101 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the computer processing component 1100 may also include one or more communication interfaces 1102 for communicating data via the local network with various external devices, such as other components of FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The computer processing component 1100 may further include an input/output controller 1103 that may communicate with one or more input devices or peripherals using an interface 1104, such as, but not limited to: a keyboard, a mouse, a touch screen/display input, microphone, pointing device, etc. The input/output controller 1103 may also communicate with output devices or peripherals, such as displays, printers, speakers, headsets, banner displays, etc.

The computer processor 1101 may be configured to execute instructions stored in volatile memory 1106, non-volatile memory 1107, or other forms of computer-readable storage media accessible to the computer processor 1101. The volatile memory 1106 may comprise various types of memory technologies, including, but not limited to: random access memory ("RAM"), dynamic random access memory ("DRAM"), static random access memory ("SRAM"), and other forms well known to those skilled in the art. The non-volatile memory 1107 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1107 may store program code and data, which also may be loaded into the volatile memory 1106 at execution time. Specifically, the non-volatile memory 1107 may store one or more program modules 1109, containing instructions for performing the processes and/or functions associated with the technologies disclosed herein, and/or operating system code 1108. In addition, these program modules 1109 may also access, generate, or store data 1110, in the non-volatile memory 1107, as well as in the volatile memory 1106. The volatile memory 1106 and/or non-volatile memory 1107 may be used to store other information including, but not limited to: records, tables, data structures, applications, programs, scripts, source code, object code, byte code, compiled code, interpreted code, machine code, executable instructions, or the like. These may be executed or processed by, for example, the computer processor 1101 and/or may form a part of, or may interact with, the program modules 1109.

The technologies described herein may be implemented in various ways, including as computer program products comprising memory storing instructions causing a computer processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. It is not necessarily to detail all the various embodiments that can utilized the concepts and technologies disclosed herein. For example, various data structures and/or list structures could be used to implement the data architectures disclosed herein. Various timer values could be defined for the customer and agent response timers. Thus, there are a myriad of variations that could be implemented by one skilled in the art in light of the foregoing disclosure. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A communications handler in a contact center configured to:
   receive an incoming short message service ("SMS") text from a remote party, wherein the remote party is identified by a mobile telephone number in the incoming SMS text;
   ascertain whether the remote party is associated with any session with any agent of the contact center by accessing a first data structure stored in a memory of the communications handler, wherein the mobile telephone number of the incoming SMS text is used as an index to the first data structure; and
   after determining the incoming SMS text is not associated with any session with any agent:
      modify the first data structure to reflect the mobile telephone number is associated with a current session, wherein the current session is associated with an agent,
      send the incoming SMS text to the agent;
      start a customer response timer upon receiving a response text initiated by the agent,
      upon expiry of customer response timer, modify the first data structure reflecting the mobile telephone number is no longer associated with the current session, and
      update a second data structure in the memory reflecting the agent is in an available state and thereby no longer associated with the current session.

2. The communications handler of claim 1, further configured to:
   retrieve the second data structure from the memory indicating a state of the agent;
   analyze the second data structure to determine the agent is in the available state and thereby available to be associated with the current session;
   select the agent to be associated with the current session after receiving the incoming SMS text and before sending the SMS text to the agent; and
   modify the second data structure after selecting the agent reflecting the agent is in an allocated state and not available to be associated with another simultaneous session.

3. The communications handler of claim 1, further configured to:
   index the incoming SMS text in a third data structure comprising a session messages table associated with the current session.

4. The communications handler of claim 1, further configured to:
   determine the response text initiated by the selected agent is not configured to pause the customer response timer.

5. The communications handler of claim 1, further configured to:
   initiate the response text from the agent in response to the agent selecting a previously stored response message from a library of previously stored response messages, wherein the previously stored response message is configured to not pause the customer response timer after being sent as the response message; and
   send the response text to the remote party.

6. The communications handler of claim 1, further configured to:
   receive a second SMS text, wherein the second SMS text uses the mobile telephone number of the remote party;
   ascertain the second SMS text is associated with the current session by accessing the first data structure, wherein the mobile telephone number of the second SMS text is used as an index to the first data structure; and
   route the second SMS text to the agent based on ascertaining the second SMS text is associated with the current session.

7. The communications handler of claim 6, further configured to:
   stop the customer response timer in response to receiving the second SMS text from the remote party.

8. A non-transitory computer readable media storing instructions that when executed by a computer processor cause the computer processor to:
- receive an incoming short message service ("SMS") text from a remote party, wherein the remote party is identified by a mobile telephone number in the incoming SMS text;
- ascertain whether the remote party is associated with any session with any agent of the contact center by accessing a first data structure stored in a memory of the communications handler, wherein the mobile telephone number of the incoming SMS text is used as an index to the first data structure; and
- after determining the incoming SMS text is not associated with any session with any agent:
  - modify the first data structure to reflect the mobile telephone number is associated with a current session, wherein the current session is associated with an agent,
  - send the incoming SMS text to the agent;
  - start a customer response timer upon receiving a response text initiated by the agent,
  - upon expiry of customer response timer, modify the first data structure reflecting the mobile telephone number is no longer associated with the current session, and
  - update a second data structure in the memory reflecting the agent is in an available state and thereby no longer associated with the current session.

9. The non-transitory computer readable medium storing instructions of claim 8, wherein the instructions are further configured to:
- retrieve the second data structure from the memory indicating a state of the agent;
- analyze the second data structure to determine the agent is in the available state and thereby available to be associated with the current session;
- select the agent to be associated with the current session after receiving the incoming SMS text and before sending the SMS text to the agent; and
- modify the second data structure after selecting the agent reflecting the agent is in an allocated state and not available to be associated with another simultaneous session.

10. The non-transitory computer readable medium storing instructions of claim 8, wherein the instructions are further configured to:
- index the incoming SMS text in a third data structure comprising a session messages table associated with the current session.

11. The non-transitory computer readable medium storing instructions of claim 8, wherein the instructions are further configured to:
- determine the response text initiated by the selected agent is not configured to pause the customer response timer.

12. The non-transitory computer readable medium storing instructions of claim 8, wherein the instructions are further configured to:
- initiate the response text from the agent in response to the agent selecting a previously stored response message from a library of previously stored response messages, wherein the previously stored response message is configured to not pause the customer response timer after being sent as the response message; and
- send the response text to the remote party.

13. The non-transitory computer readable medium storing instructions of claim 8, wherein the instructions are further configured to:
- receive a second SMS text, wherein the second SMS text uses the mobile telephone number of the remote party;
- ascertain the second SMS text is associated with the current session by accessing the first data structure, wherein the mobile telephone number of the second SMS text is used as an index to the first data structure; and
- route the second SMS text to the agent based on ascertaining the second SMS text is associated with the current session.

14. The non-transitory computer readable medium storing instructions of claim 8, wherein the instructions are further configured to:
- stop the customer response timer in response to receiving the second SMS text from the remote party.

15. The communications handler of claim 8, further configured to:
- retrieve the second data structure from the memory indicating a state of the agent;
- analyze the second data structure to determine the agent is in the available state and thereby available to be associated with the current session;
- select the agent to be associated with the current session after receiving the incoming SMS text and before sending the SMS text to the agent; and
- modify the second data structure after selecting the agent reflecting the agent is in an allocated state and not available to be associated with another simultaneous session.

16. A method for processing an incoming short message service ("SMS") text comprising:
- receiving an incoming short message service ("SMS") text from a remote party, wherein the remote party is identified by a mobile telephone number in the incoming SMS text;
- ascertaining whether the remote party is associated with any session with any agent of the contact center by accessing a first data structure stored in a memory of the communications handler, wherein the mobile telephone number of the incoming SMS text is used as an index to the first data structure; and
- after determining the incoming SMS text is not associated with any session with any agent:
  - modifying the first data structure to reflect the mobile telephone number is associated with a current session, wherein the current session is associated with an agent,
  - sending the incoming SMS text to the agent;
  - starting a customer response timer upon receiving a response text initiated by the agent,
  - upon expiry of customer response timer, modifying the first data structure reflecting the mobile telephone number is no longer associated with the current session, and
  - updating a second data structure in the memory reflecting the agent is in an available state and thereby no longer associated with the current session.

17. The method of claim 16, further configured to:
- indexing the incoming SMS text in a third data structure comprising a session messages table associated with the current session.

18. The method of claim 16, further configured to:

determining the response text initiated by the selected agent is not configured to pause the customer response timer.

19. The method of claim 16, further configured to:

initiating the response text from the agent in response to the agent selecting a previously stored response message from a library of previously stored response messages, wherein the previously stored response message is configured to not pause the customer response timer after being sent as the response message; and sending the response text to the remote party.

20. The method of claim 16, further configured to:

receiving a second SMS text, wherein the second SMS text uses the mobile telephone number of the remote party;

stopping the customer response timer in response to receiving the second SMS text from the remote party;

ascertaining the second SMS text is associated with the current session by accessing the first data structure, wherein the mobile telephone number of the second SMS text is used as an index to the first data structure; and routing the second SMS text to the agent based on ascertaining the second SMS text is associated with the current session.

\* \* \* \* \*